United States Patent
Arnebeck

(10) Patent No.: US 8,103,597 B2
(45) Date of Patent: Jan. 24, 2012

(54) OPTIMIZING SCHEDULE AND ITINERARY FOR OPEN HOUSES

(76) Inventor: Kristopher John Arnebeck, Belchertown, MA (US)

( * ) Notice: Subject to any disclaimer, the term of this patent is extended or adjusted under 35 U.S.C. 154(b) by 1318 days.

(21) Appl. No.: 11/624,043

(22) Filed: Jan. 17, 2007

(65) Prior Publication Data

US 2007/0168211 A1    Jul. 19, 2007

Related U.S. Application Data

(60) Provisional application No. 60/759,316, filed on Jan. 17, 2006.

(51) Int. Cl.
*G06Q 50/00* (2006.01)
(52) U.S. Cl. ........................................ 705/313
(58) Field of Classification Search .................. 705/313
See application file for complete search history.

(56) References Cited

U.S. PATENT DOCUMENTS

| | | | |
|---|---|---|---|
| 5,032,989 A | 7/1991 | Tornetta | |
| 6,236,977 B1 | 5/2001 | Verba et al. | |
| 6,597,983 B2 | 7/2003 | Hancock | |
| 6,636,803 B1 | 10/2003 | Hartz, Jr. et al. | |
| 6,684,196 B1 | 1/2004 | Mini et al. | |
| 2002/0022980 A1 | 2/2002 | Mozayeny et al. | |
| 2002/0046077 A1 | 4/2002 | Mozayeny et al. | |
| 2003/0220806 A1* | 11/2003 | Hoffman et al. | 705/1 |
| 2005/0086158 A1 | 4/2005 | Clare | |
| 2005/0096926 A1 | 5/2005 | Eaton et al. | |
| 2006/0143083 A1* | 6/2006 | Wedeen | 705/14 |
| 2009/0307050 A1* | 12/2009 | Fournier | 705/10 |

OTHER PUBLICATIONS

Saccacio, James. "What's your home's value?" www.news-blogs.com/finance. Nov. 10, 2005.*

* cited by examiner

*Primary Examiner* — Jami A Plucinski
*Assistant Examiner* — Vern Cumarasegaran
(74) *Attorney, Agent, or Firm* — Merchant & Gould P.C.

(57) ABSTRACT

A computer system for scheduling open houses can include an activity analysis module programmed to analyze one or more characteristics or factors associated with one or more properties that are located within an activity zone. The computer system can also include a schedule optimization module programmed to suggest an optimum time for a seller to schedule an open house on a particular date, and the schedule optimization module being programmed to suggest an open house itinerary for a buyer. The computer system can also include an activity alert module programmed to monitor the computer system and to notify the buyer or the seller of new activities in the computer system.

14 Claims, 27 Drawing Sheets

US 8,103,597 B2

OPTIMIZING SCHEDULE AND ITINERARY FOR OPEN HOUSES

RELATED APPLICATION

This application claims the benefit of U.S. Patent Provisional Application Ser. No. 60/759,316 filed on Jan. 17, 2006, the entirety of which is hereby incorporated by reference.

BACKGROUND

An open house is an important tool used by property sellers to increase interest in a property that is being sold, as well as used by potential buyers to gauge their own interest in a particular property. The property seller can increase the likelihood of the sale of the property, as well as the potential sale price, by maximizing the number of potential buyers that attend a particular open house. In order to increase attendance, the seller typically attempts to schedule the open house at a time during which buyers are most likely to be free to attend the open house. For example, the seller can assume that buyers are typically free on Sunday afternoons to attend an open house. However, such assumptions may not accurately reflect the marketplace and fails to account for other factors that can impact open house attendance. It is therefore difficult for the seller to determine an optimal time for scheduling the open house due to the limited information available to the seller.

In addition, a potential buyer who is interested in purchasing a property in a particular geographic area sometimes wants to visit multiple open houses in the geographic area. It is sometimes difficult for the potential buyer to determine which open houses to attend at which times so that the buyer can maximize use of his or her time.

DESCRIPTION OF THE DRAWINGS

Reference will now be made to the accompanying drawings, which are not necessarily drawn to scale, and wherein.

DETAILED DESCRIPTION

Example embodiments will now be described more fully hereinafter with reference to the accompanying drawings. These embodiments are provided so that this disclosure will be thorough and complete. Like numbers refer to like elements throughout.

Example embodiments disclosed herein relate generally to the optimization of the scheduling of an open house for the lease or sale of property. In example embodiments described herein, the property is residential real estate, such as a house or condominium. In alternative embodiments, the property can be other types of properties, such as commercial property or rental property.

Figure 1:
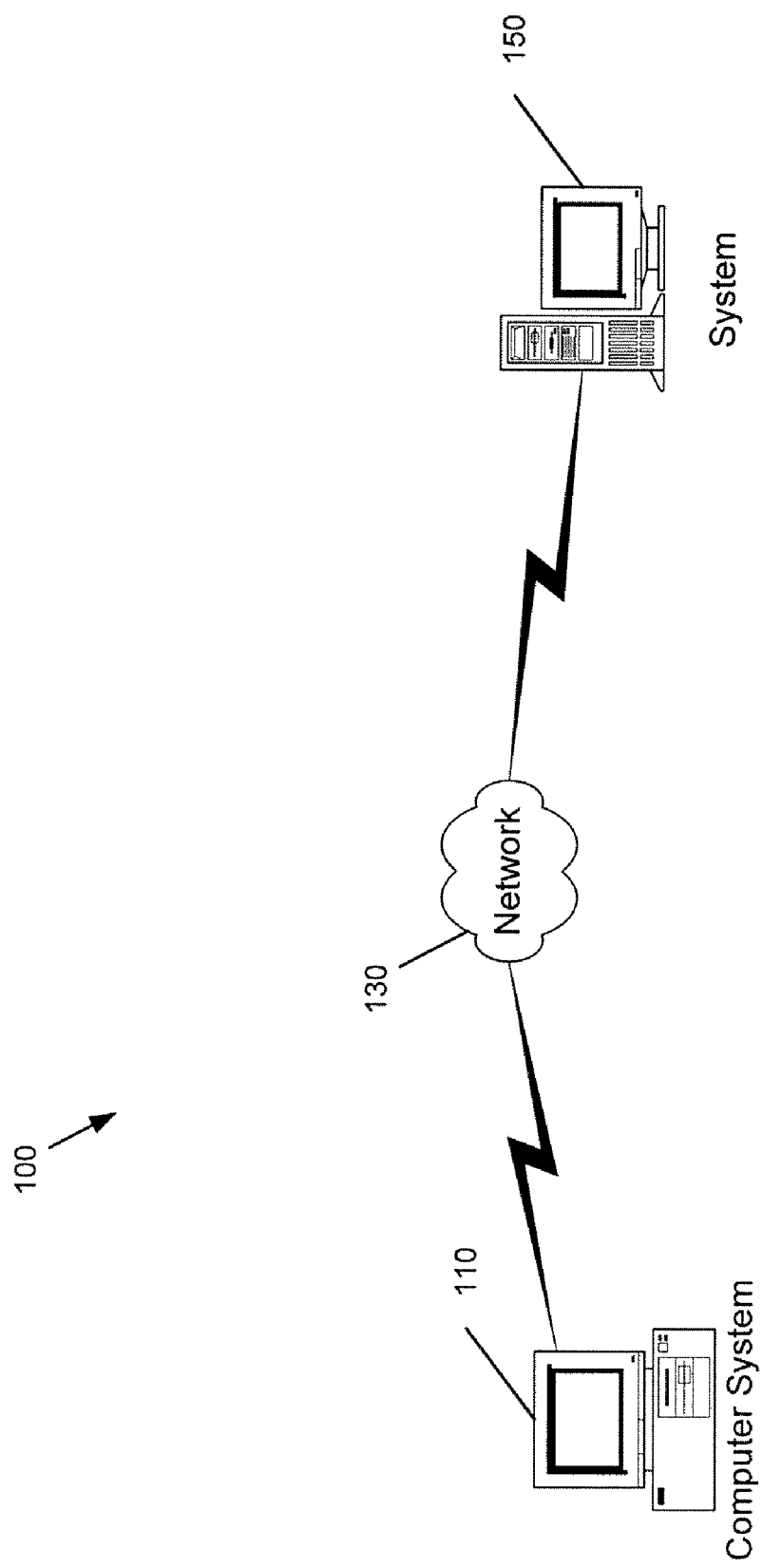
FIG. 1 illustrates an example computing environment including an example system programmed to optimize the scheduling of an open house.

Referring now to FIG. 1, an example computing environment 100 includes a computer system 110, a network 130, and a system 150. Example computer system 110 can be controlled by a user, such as a buyer or seller of property, to communicate through network 130 with system 150.

In example embodiments described herein, the term "buyer" encompasses the individual or individuals who are interested in purchasing one or more properties, as well as representatives/agents of the individuals such as a buyer's agent. The term "seller" encompasses the individual or individuals who are interested in selling one or more properties, as well as representatives/agents of the individuals such as a seller's agent. Unless otherwise specified, the term "user" encompasses a buyer, a seller, or both a buyer and a seller.

Computer system 110 can include a processing unit and computer readable media. Computer readable media can include memory such as volatile (such as RAM), non-volatile (such as ROM, flash memory, etc.) or some combination thereof. Additionally, computer system 110 can also include mass storage (removable and/or non-removable) such as a magnetic or optical disks or tape. An operating system and one or more application programs can be stored on the mass storage device. Computer system 110 can include input devices (such as a keyboard and mouse) and output devices (such as a monitor and printer). Computer system 110 can also include network connections to other devices, computers, networks, servers, etc.

In example embodiments, computer system 110 can communicate with system 150 through network 130. In example embodiments, network 130 is a local area network (LAN), a wide area network (WAN), the Internet, or a combination thereof. Communications between computer system 110, network 130, and system 150 can be implemented using wired and/or wireless technologies.

In some embodiments, computer system 110 is a mobile device such as laptop, or a handheld computing device such as a personal digital assistant ("PDA") or cellular telephone. The mobile device can be powered by a battery and can be configured to communicate wirelessly with network 130. In example embodiments, buyers and sellers can carry the mobile device. For example, a buyer can carry the mobile device as the buyer visits one or more properties, and the mobile device can provide the buyer with information such as driving directions to the properties and/or information about the properties. In some embodiments, the mobile device can also provide the buyer or seller with updated information, such as new open houses scheduled in the area.

In example embodiments, system 150 is one or more web servers that host one or more web sites that are accessible from network 130. System 150 can include one or more data stores associated with system 150 such as, for example, one or more databases. One example of such a database is the SQL Server offered by Microsoft Corporation of Redmond, Wash. System 150 can also include or interface with third party systems or databases. One example of such a third party database is a Multiple Listing Service ("MLS") that includes real estate listings for available properties in an area. Another example is a geographic information system ("GIS") that stores geographic information related to a particular area, such as maps.

In the embodiments disclosed herein, the user of computer system 110 can access a web site hosted by system 150 using a program on computer system 110, such as a browser, using known protocols such as hypertext markup language ("HTML") and/or extensible markup language ("XML"). One example of a browser is the Internet Explorer browser offered by Microsoft Corporation. Other types of browsers and configurations are possible. In one embodiment, system 150 hosts one or more active server pages (ASPs) supporting various embedded programming code, such as ASP.NET offered by Microsoft Corporation. In alternative embodiments, a proprietary client other than a browser on computer system 110 can be used to access system 150.

Figure 2:
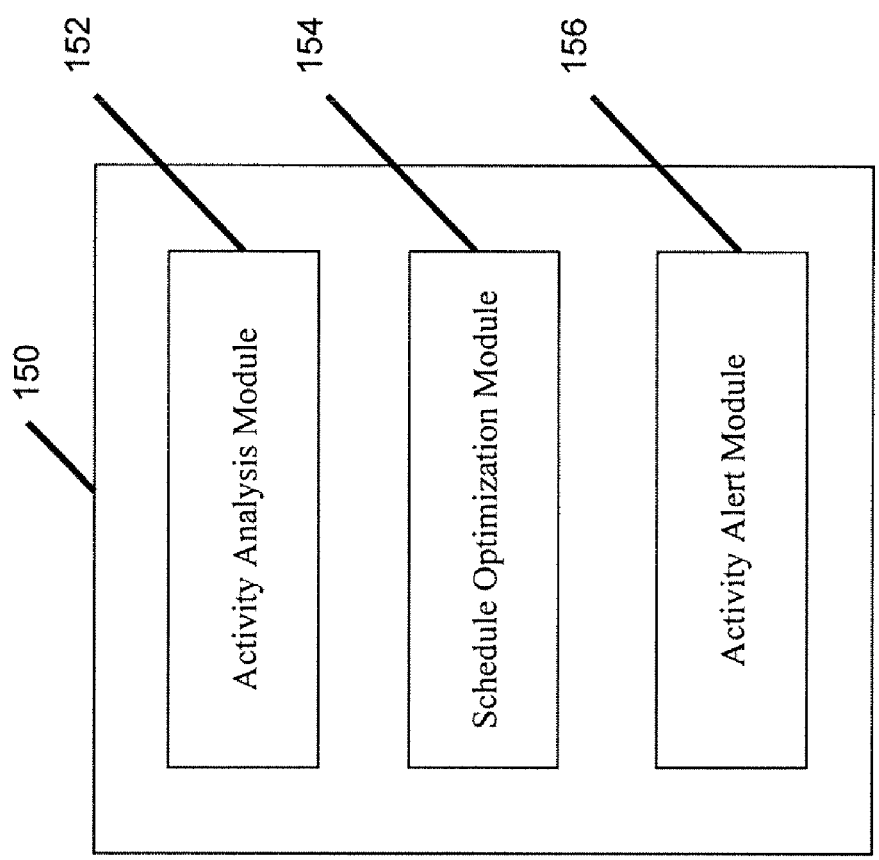
FIG. 2 illustrates example modules of the system of FIG. 1.

Referring now to FIG. 2, in example embodiments, system 150 is programmed to include one or more of an activity analysis module 152, a schedule optimization module 154, and an activity alert module 156. Generally, modules 152, 154, 156 are programmed to analyze current buyer and seller activity, suggest optimal times to schedule an open house, create open house itineraries, and notify buyers and sellers of new activity related to open houses.

Referring now to FIGS. 3-8, activity analysis module 152 is programmed to examine one or more characteristics or factors associated with one or more properties that are located within an activity zone of interest to a buyer or seller. These factors are used to quantify the relevant level of buyer and seller open house activity occurring on a particular date in order to identify the optimal dates for an upcoming open house.

In example embodiments, the activity zone is a specific geographic area that includes properties currently for sale within a specific radius of a center property. The center property is the property for which a seller is scheduling an open house. The radius of the activity zone can be defined to have one or more values. In example embodiments, the activity zone is defined to include a 0.5 mile, 1 mile, 2 mile, 3 mile, or 5 mile radius. Other geographic areas can be used to define the activity zone, such as a neighborhood, zip code, school district, and similar geographic regions.

Figure 3:
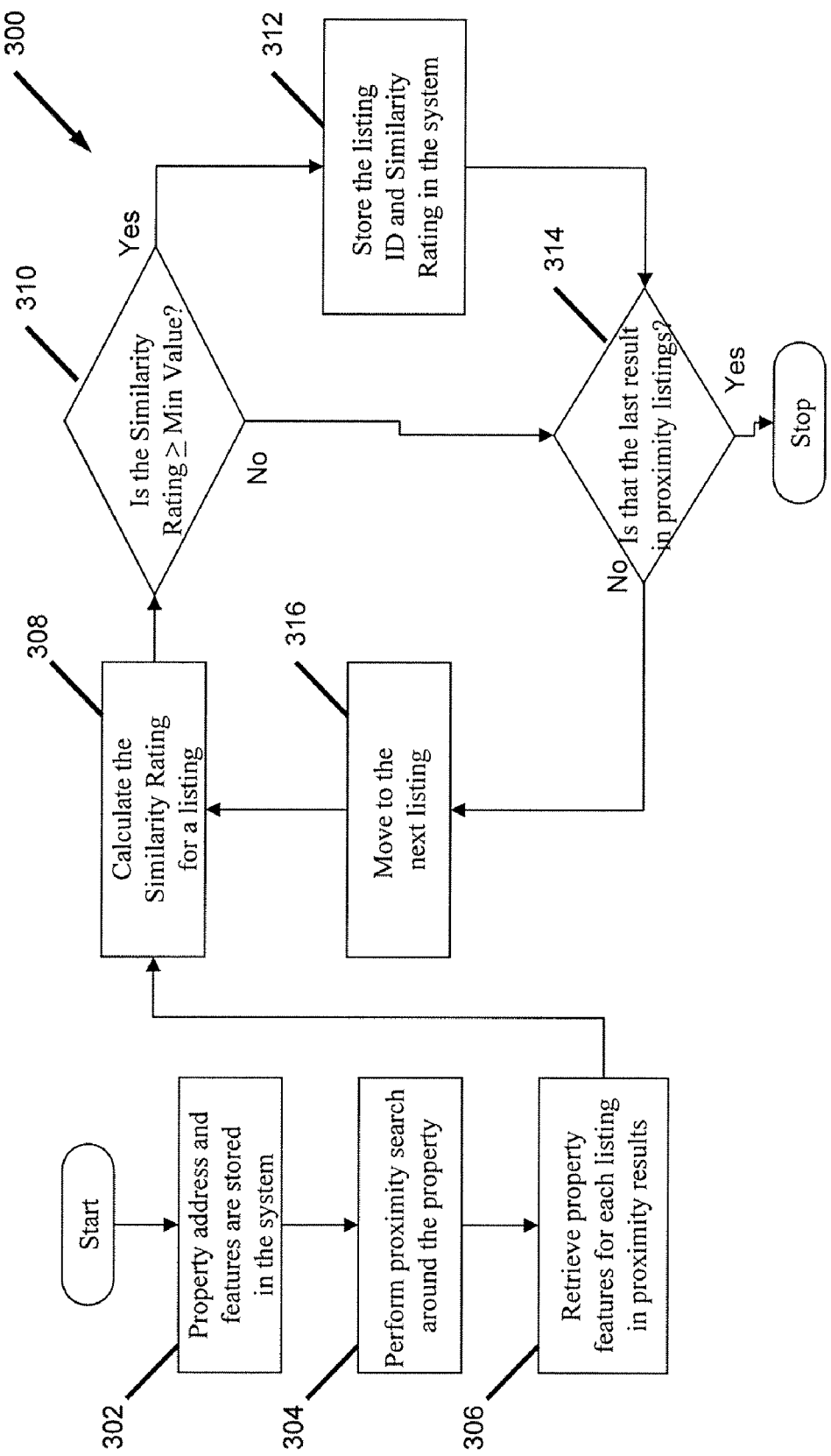
FIG. 3 illustrates an example method for determining activity zone properties.

Referring now to FIG. 3, activity analysis module 152 is programmed to examine a proximity surrounding a property when the property is added to system 150 in accordance with an example method 300. Method 300 can begin at operation 302, where a new property is added to the system. This property becomes the center property in the activity zone. In example embodiments, information related to the center property can be added manually to the system, by filling in information about the property, or information related to the center property can be uploaded into the system from another database, such as an MLS or from other websites via a web service or RSS feed or web crawler. Next, at operation 304, the system performs a proximity search.

Figure 4:
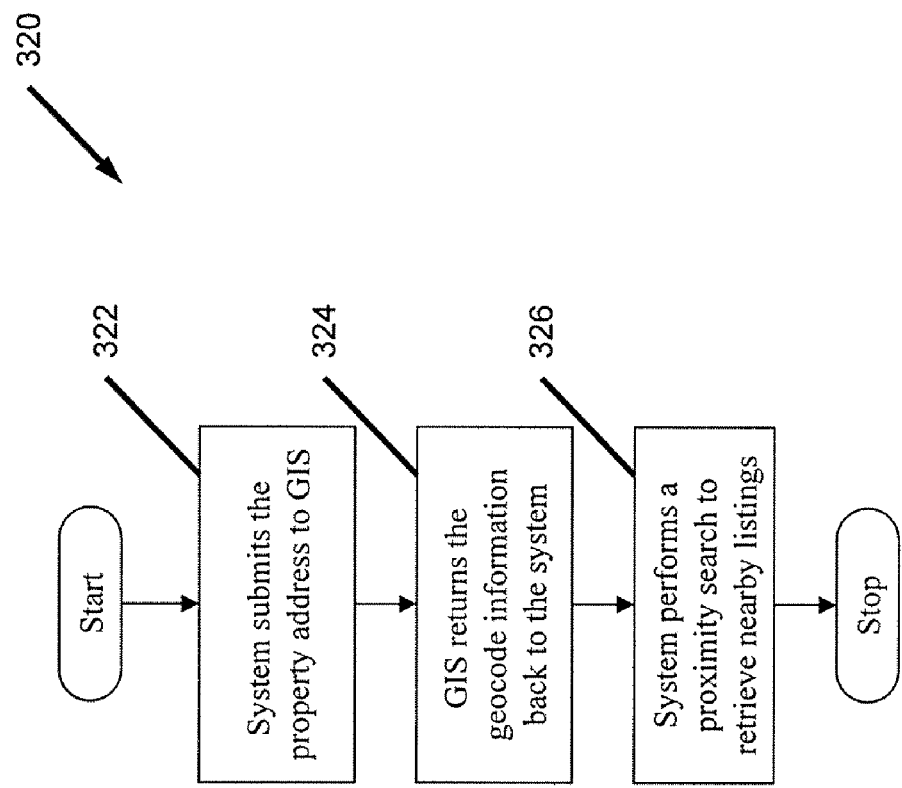
FIG. 4 illustrates an example method for performing a proximity search as part of the method of FIG. 3.

Referring now to FIG. 4, an example method 320 for performing a proximity search. At operation 322 of method 320, the system automatically submits the address of the center property to one or more GISs, in order to obtain the geocode for that particular address. Next, at operation 324, geocode information is returned from the GISs and stored in the system. Next, at operation 326, a proximity search is performed by the system using a proximity search algorithm to identify other properties that are for sale in the activity zone surrounding the center property. In one example, the proximity search algorithm compares the latitude/longitude of the center property to that of other properties in the geographic area to estimate a distance between the center property and each other property in the geographic area. In example embodiments, the results include identification information and calculate distance to the center property for the properties identified in the proximity search.

Referring back to FIG. 3, after the proximity search is performed in operation 304, control is then passed to operation 306 and the system retrieves property features related to the identified properties. Property features can include characteristics of each property such as, for example, number of bedrooms, number of full-bathrooms, number of half-bathrooms, property type (e.g., attached or single family), square footage, asking price, and year built. Other characteristics can also be used. Next, at operation 308, a similarity rating is calculated between one of the identified properties and the center property.

The similarity rating calculation quantifies the similarity of an activity zone property to the center property. The similarity rating is used to identify activity zone properties that are most relevant to the center property. In example embodiments, the similarity rating is calculated by modeling similarity according to a delta factor, as illustrated in example Equation A below.

$$\text{Similarity Rating} = SF_{SR} \times e^{(-(x_A)^2/(2\sigma^2))} \tag{A}$$

where:
$SF_{SR}$=similarity rating scale factor=100
$\sigma=4$
$e$=natural logarithm
$x_A$=delta factor In Equation A, the $SF_{SR}$ is an arbitrary scale factor. The factor $\sigma$ is used to change the effect of the delta factor $x_A$. For example, if the factor $\sigma$ is increased, properties having a greater delta factor $x_A$ can exhibit a greater similarity rating.

The delta factor $x_\Delta$ can be calculated using Equation B below. Other values for $\sigma$ and $SF_{SR}$ can be used, or a different equation can be used to quantify similarity.

Figure 5:
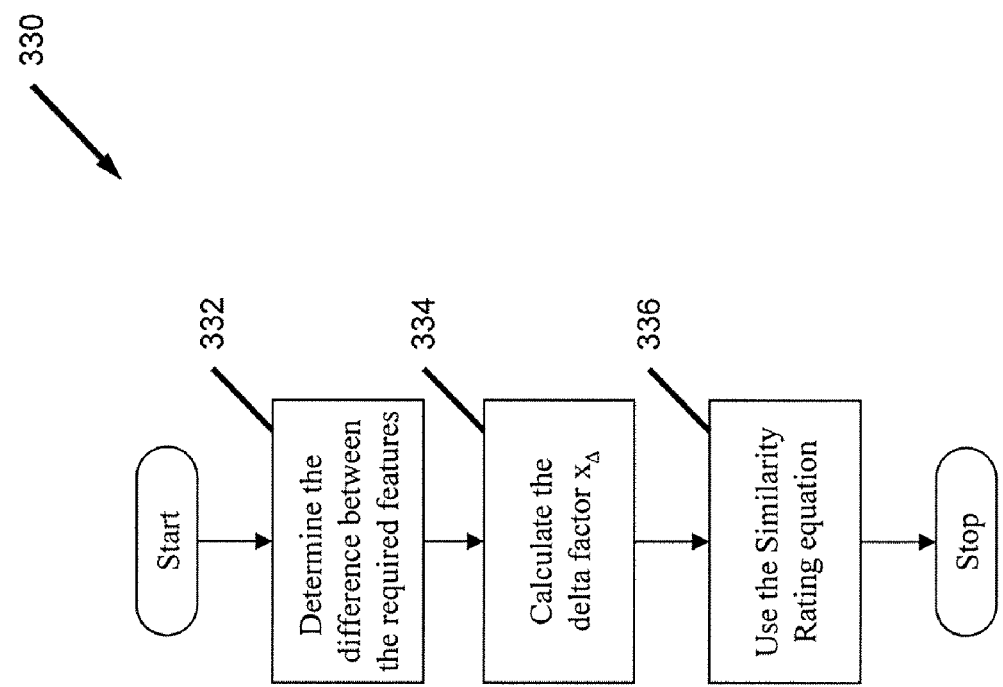
FIG. 5 illustrates an example method for calculating a similarity rating as part of the method of FIG. 3.

Referring now to FIG. 5, an example method 330 for calculating the similarity rating of operation 308 is shown. At operation 332 of method 330, the differences between the property characteristics of the center property and one of the properties identified in the activity zone are calculated. Next, at operation 334, the delta factor is calculated by multiplying each of a plurality of variables (e.g. difference in property characteristics) by its respective scale factor, as illustrated in example Equation B below. This delta factor is used to calculate the similarity rating at operation 336 using, for example, Equation A provided above.

$$x_\Delta \Sigma(|\Delta_C| \times SF_C) = (|\Delta_{BR}| \times SF_{SR}) + (|\Delta_{F\text{-}BA}| \times SF_{F\text{-}BA}) + \ldots + (|\Delta_S| \times SF_S) \quad (B)$$

where:
$\Delta_C$=center property characteristic−activity zone property characteristic
$SF_C$=scale factor for a specific characteristic In example embodiments, the scale factors are determined by multiplying a normalization factor and a weighting factor. Example scale factors are calculated as follows:
bedroom=8.5×0.15=1.275;
full-bathroom=7×0.15=1.05;
half-bathroom=5×0.1=0.5;
property type=0.3×0.13=0.039 (with condo=5, townhouse=20, single family=30, and multi-family=35);
square feet=0.02×0.1=0.0002;
year built=0.2×0.1=0.02;
price=143×0.14=20.02; and
distance=7×0.13=0.91 (distances measured in miles to the nearest 0.01).

The scale factors provided above are examples. Other scale factors can be used, and the value of the scale factors can be varied.

Referring back to FIG. 3, after the similarity rating is calculated in operation 308, control is then passed to operation 310 and a determination is made regarding whether or not the similarity rating is greater than a minimum value. This minimum value represents the lowest similarity rating that a property can have to be included in the activity zone. Those with lower similarity ratings can be ignored since their effects can typically be negligible. In example embodiments, the minimum value is 0.1. If the similarity rating is greater than or equal to this minimum value, control is passed to operation 312, and the system enters the property into the activity zone table, described below, and control is passed to operation 314. Alternatively, if the similarity rating is less than this minimum value at operation 310, control is passed to operation 314.

Next, at operation 314, a determination is made as to whether the presently examined property is the last property identified in the proximity search. If there are more properties to examine, control is passed to operation 316, and the system moves to the next property. Control is then passed to operation 308 to perform the similarity rating for the next property.

Figure 6:
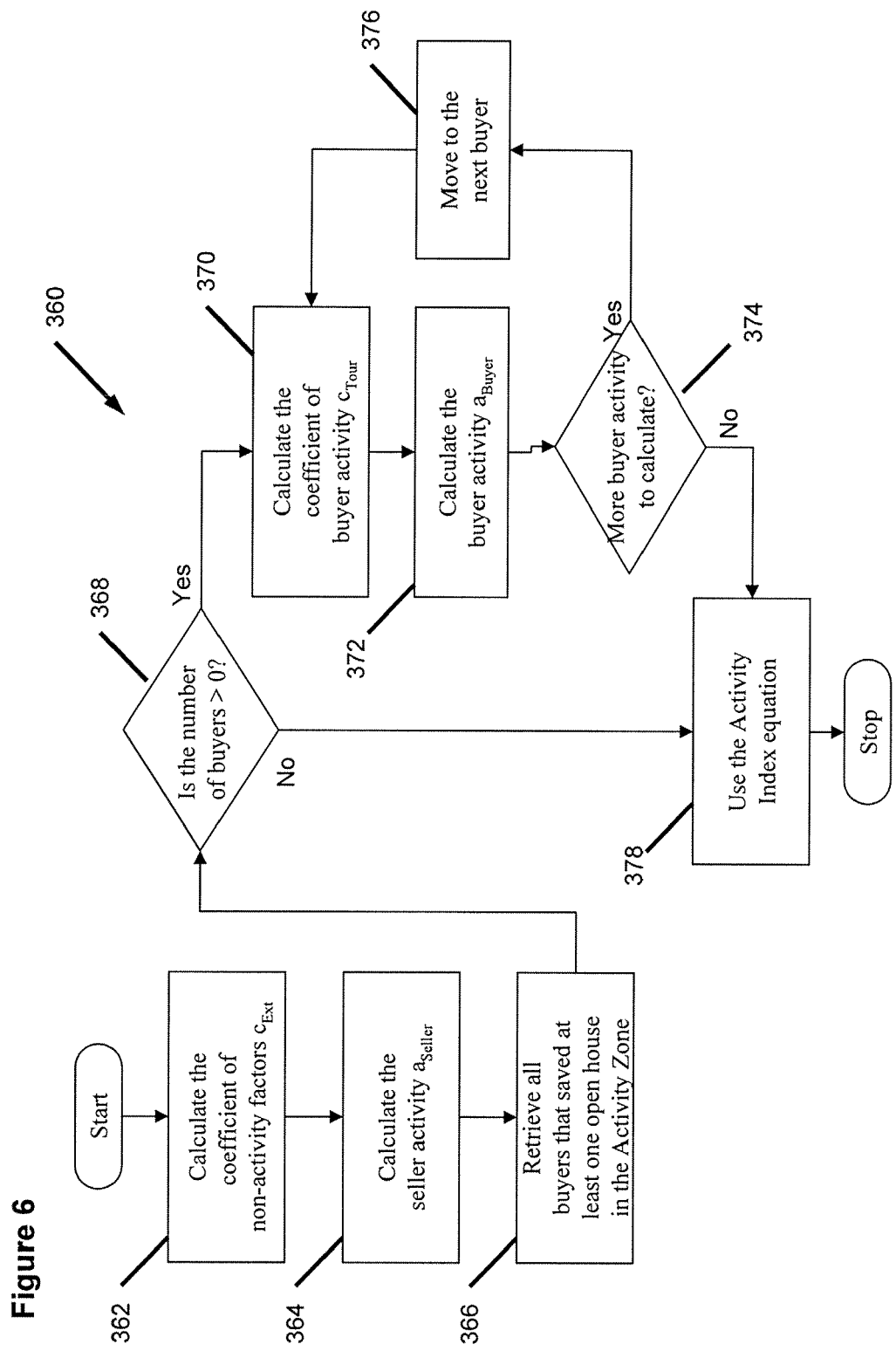
FIG. 6 illustrates an example method for calculating an activity index for a particular date.

Referring now to FIG. 6, activity analysis module 152 is also programmed to perform a method 360 to calculate an activity index. Generally, the activity index is used to quantify seller and buyer open house activity within an activity zone for any given day. In example embodiments, the system calculates an activity index for each of the upcoming 22 days and displays these values to the seller. This enables the system and seller to compare dates and identify the optimal date to schedule an upcoming open house. Alternative values can be used for the number of upcoming days to calculate. The activity index is determined using example Equation C below.

$$\text{Activity Index} = c_{Ext} \times (a_{Seller} + \Sigma a_{Buyer}) \quad (C)$$

where:
$c_{Ext}$=coefficient of non-activity factors (e.g. weather, holidays, etc)
$a_{Seller}$=activity level from existing open houses (e.g. seller activity)
$a_{Buyer}$=activity level from a particular buyer (e.g. buyer activity)

Both seller and buyer activity levels are determined by using the same general equation to model activity. However, seller activity takes into consideration each open house in the activity zone, while the buyer activity is computed by summing the activity for each individual buyer planning to attend an open house within the activity zone.

Calculating the activity index on a particular day can begin at operation 362 of method 360 by calculating the coefficient of non-activity factors, $c_{Ext}$. This coefficient is used to adjust the activity index based on non-activity factors that are likely to affect open house attendance on that day. These factors can include things such as a date that is a holiday or an unfavorable weather forecast on a particular date. In example embodiments, $c_{Ext}$ can be calculated using example Equation D below. Alternative equations can be used to account for non-activity factors. Next, at operation 364, the seller activity is calculated.

$$c_{Ext} = SF_{Ext} \times c_H \times c_W \quad (D)$$

where:
$SF_{Ext}$=scale factor for non-activity factors=100
$c_H$=coefficient of holiday dates=0.5
$c_W$=coefficient of predicted weather In Equation D, the $SF_{Ext}$ is an arbitrary scale factor. The coefficient of holiday dates $c_H$ is used to factor the effect of holidays into Equation D. For example, if the particular day is a holiday, the day can be weighted less than if the day is not a holiday. The coefficient of predicted weather $c_W$ is used to factor the predicted weather for a given day into Equation D. For example, if the predicted weather for a day is for a blizzard, the day is weighted less than if the predicted weather is for sun shine and mild temperatures. The predicted weather can be inputted manually, or provided from an automated feed. Other values for $SF_{Ext}$, $c_H$, and $c_W$ can be used.

Figure 7:
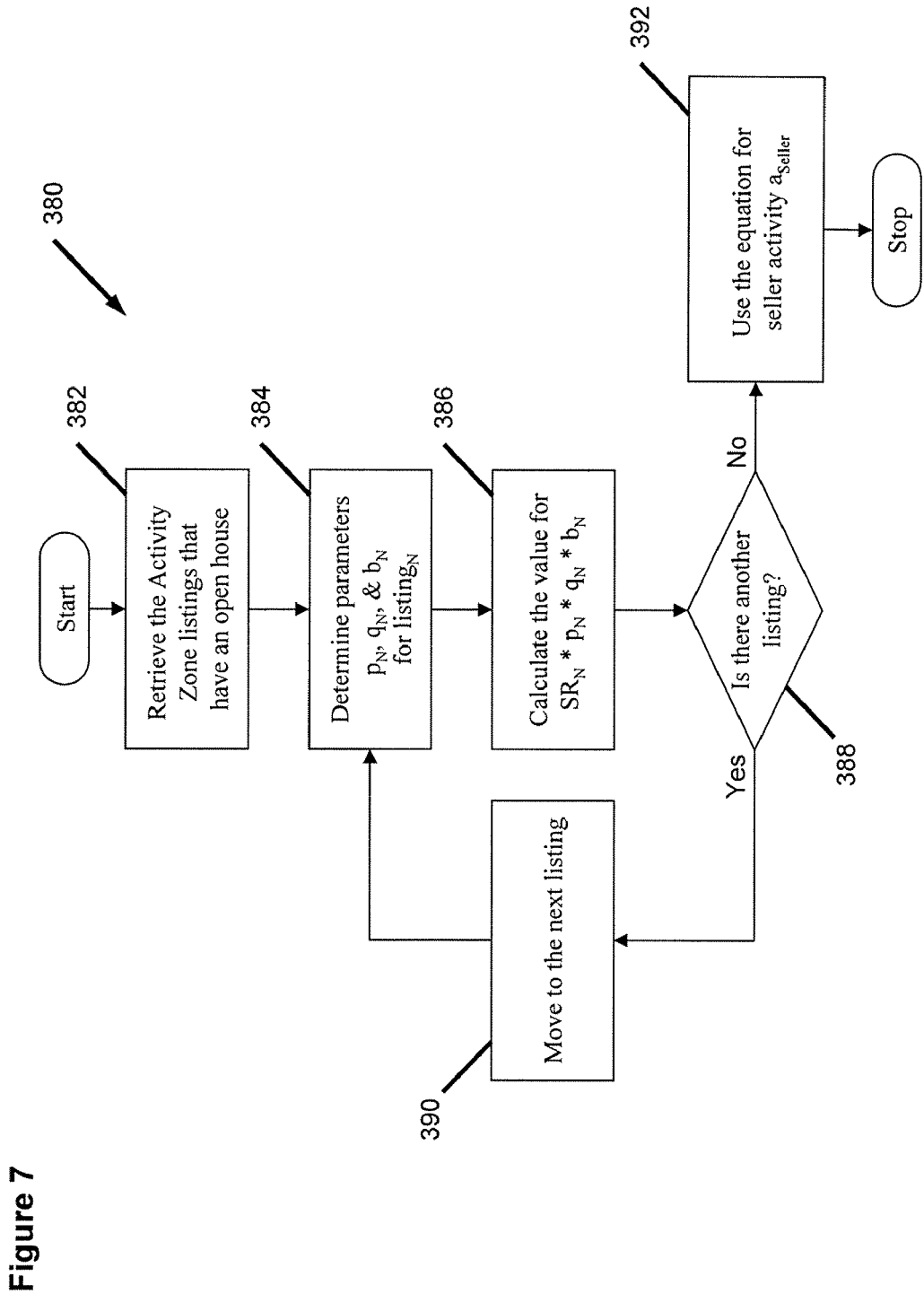
FIG. 7 illustrates an example method for calculating seller activity as part of the method of FIG. 6.

Referring now to FIG. 7, an example method 380 for calculating the seller activity of operation 364 is shown. Seller activity is used for determining the inferred buyer activity as a result of nearby open houses. In example embodiments, calculating overall seller activity, $a_{seller}$, is performed using example Equation E, shown below.

$$a_{Seller} = c_{Tour} \times x_{Buyers} \times \Sigma(SR_N \times p_N \times q_N \times b_N) \quad (E)$$

where:
$c_{Tour}$=coefficient of buyer activity=see Equation F below
$x_{Buyers}$=number of anticipated buyers at an open house=$c_{AZ} \times \mu \times N$
$c_{AZ}$=coefficient of relative seller activity
$\mu$=average number of buyers at an open house
$N$=number of activity zone properties with open houses on that date
$SR_N$=similarity rating for property N
$p_N$=probability of the buyers attending the open house for property N
$q_N$=activity quality for property N
$b_N$=ratio of unique buyers for property N The number of anticipated buyers, $x_{Buyers}$, is calculated using the derived equation seen in Equation G. The coefficient of relative seller activity, $c_{AZ}$, is a value that indicates the ratio of unique buyers in the activity zone. This factor is determined by modeling the overall similarity among the open houses in the activity zone on a particular date. For example, the coefficient of relative seller activity can be directly proportional to the standard deviation of similarity ratings in the activity zone on a particular date. This is because the number of anticipated buyers attending an open house does not account for the same buyer attending other nearby open houses. In example embodiments, the default value for the average number of buyers attending an open house is five (5). Alternative values and factors can be used to determine the indicators.

The probability of buyers attending, $p_N$, is a value that indicates the likelihood of the anticipated buyers attending a particular open house. When used for calculating seller activity, this factor is determined by analyzing the number of recent and upcoming open houses for this property. For example, the probability of buyers attending can be inversely proportional to the total number of recent and upcoming open houses at this property. This is because some anticipated buyers might have already attended a previous open house or intend on visiting a future open house. Alternative factors can be used to determine the indicators.

The activity quality, $q_N$, is a value that indicates buyer attraction to a particular open house. This factor is determined by analyzing open houses shared among the activity zones of both the center property and a particular open house. For example, the activity quality can be inversely proportional to the average similarity rating of these open houses, where similarity ratings are with respect to the particular property (as opposed to the center property). Alternative indicators can be used. Alternative factors can be used to determine the indicators.

The ratio of unique buyers, $b_N$, is a value that indicates the percentage of the total unique buyers likely to attend a particular open house. This factor is determined by comparing the similarity rating of a particular open house to the mean similarity rating in the activity zone. For example, the ratio of unique buyers can be directly proportional to the number of standard deviations the similarity rating of the particular open house is from the mean of the activity zone. Alternative factors can be used to determine the indicators.

At operation 382 of method 380, the system retrieves all the open house listings in the activity zone for that particular day. Next, at operation 384, the value of parameters $p_N$, $q_N$, and $b_N$ for one of the resulting open houses is determined. Next, at operation 386, the system calculates the value contributed by this open house to be used in the summation. Next, at operation 388, if there are more results that need values calculated, control is passed to operation 390 that moves to the next result and then onto operation 384. Alternatively, control is passed to operation 392 to calculate seller activity using example Equation E above.

Referring back to FIG. 6, at operation 366 the system retrieves all the buyers that have at least one open house saved in the activity zone. Next, at operation 368, if these results equal zero, control is passed to operation 378 and the activity index is calculated using zero as the value for the summation of buyer activity. Alternatively, control is passed to operation 370 to calculate the $c_{Tour}$. This coefficient is used to characterize buyers with certain characteristics more favorably, such as already being pre-approved for a mortgage. In example embodiments, the coefficient can be calculated using example Equation F below.

$$c_{Tour} = SF_{Tour} \times c_M \times c_{Activity} \qquad (F)$$

where:
$SF_{Tour}$=scale factor for buyer activity=1
$c_M$=coefficient of mortgage approval
$c_{Activity}$=coefficient of individual activity The scale factor for buyer activity $SF_{Tour}$ is an arbitrary scale factor that can be changed. The coefficient of mortgage approval $c_M$ is a factor that takes into account whether or not the particular potential buyer has been pre-approved for a mortgage. The coefficient of mortgage approval $c_M$ can be increased depending on the amount of pre-approval. The coefficient of individual activity $c_{Activity}$ is a factor that is increased depending on the amount of activity for a particular potential buyer. For example, this factor can be increased if the buyer has scheduled to visit multiple open houses in an activity zone on a particular day.

The coefficient of buyer activity, $c_{Tour}$, weights the value of the activity for a particular buyer. This factor is determined by the characteristics of the buyer and current activity patterns. For example, a buyer that already has a loan approved for more than the asking price of a center property can have a higher $c_{Tour}$ than a buyer whose loan approval is unknown. Another example is the coefficient of buyer activity can be directly proportional to the percentage of saved open houses in the activity zone of the center property. Alternative factors can be used to determine the indicators. Next, at operation 372, individual buyer activity is calculated.

Figure 8:
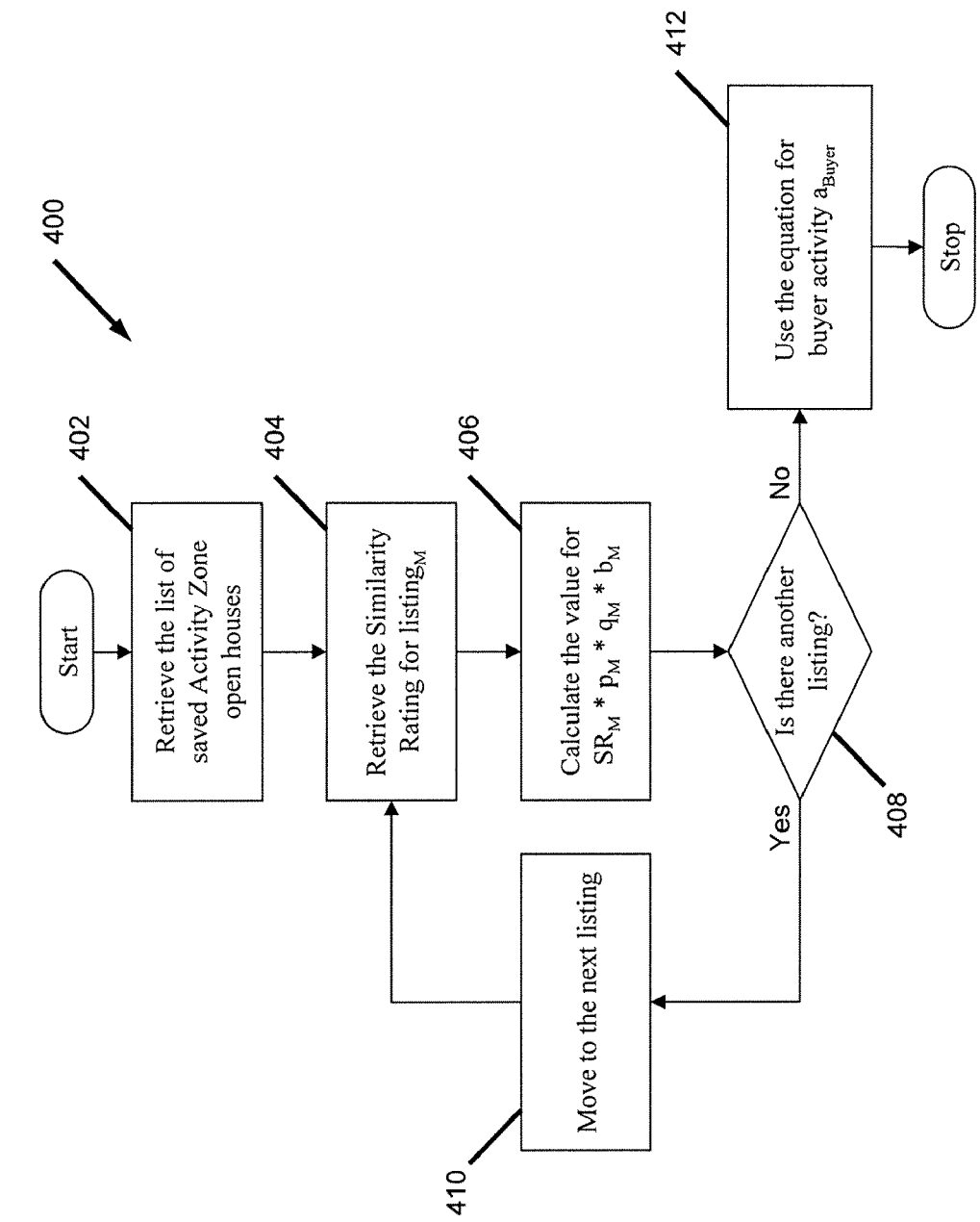
FIG. 8 illustrates an example method for calculating buyer activity as part of the method of FIG. 6.

Referring now to FIG. 8, an example method 400 for calculating buyer activity of operation 372 is shown. Individual buyer activity is used to determine inferred buyer activity as a result of open house intentions for that specific individual. Buyers may save an open house by selecting the attendance options "yes" or "maybe." Changes to these options can be made. In example embodiments, calculating individual buyer activity, $a_{Buyer}$, is performed using example Equation G, shown below.

$$a_{Buyer} = c_{Tour} \times x_{Buyers} \times \Sigma(SR_M \times p_M \times q_M \times b_M) \qquad (G)$$

where:
$c_{Tour}$=coefficient of buyer activity
$x_{Buyers}$=number of anticipated buyers at an open house=1
M=activity zone properties the buyer intends to visit
$SR_M$=similarity rating for property M
$p_M$=probability of the buyers attending the open house for property M
$q_M$=activity quality for property M
$b_M$=ratio of unique buyers for property M=1

The value of $x_{Buyers}$ equals one (1) because the buyer activity equation focuses on an individual buyer. Likewise, the value of $b_M$ equals one (1) because the buyer activity equation calculates only one unique buyer at a time. The value of $q_M$ is the same as calculated in the seller activity (see Equation E). The value of $p_M$ is based upon the selection made by the buyer while saving an open house. In example embodiments, the probability is 0.9 when a buyer chooses "yes" and 0.5 when the buyer chooses "maybe." Alternative values can be used.

At operation 402 of method 400, the system retrieves the open houses in the activity zone for that particular day this buyer has saved. Next, at operation 404, the similarity rating for one of the resulting open houses is retrieved. Next, at operation 406, the system calculates the value contributed by this open house to be used in the summation. Next, at operation 408, if there are more results that need values calculated, control is passed to operation 410 that moves to the next result and then onto operation 404. Alternatively, control is passed to operation 412 to calculate buyer activity using example Equation G above.

Referring back to FIG. 6, at operation 374 the system checks if there exists more buyer activity to calculate. If more buyer activity is to be calculated, control is passed to operation 376 that moves to the next buyer and then onto operation 370. Alternatively, control is passed to operation 378 that calculates the activity index using example Equation C above.

Referring now to FIGS. 9-12, schedule optimization module 154 is programmed to utilize the factors calculated by activity analysis module 152 to suggest an optimum time for the seller to schedule an open house on a particular date, and/or to suggest open house itineraries for buyers.

Figure 9:
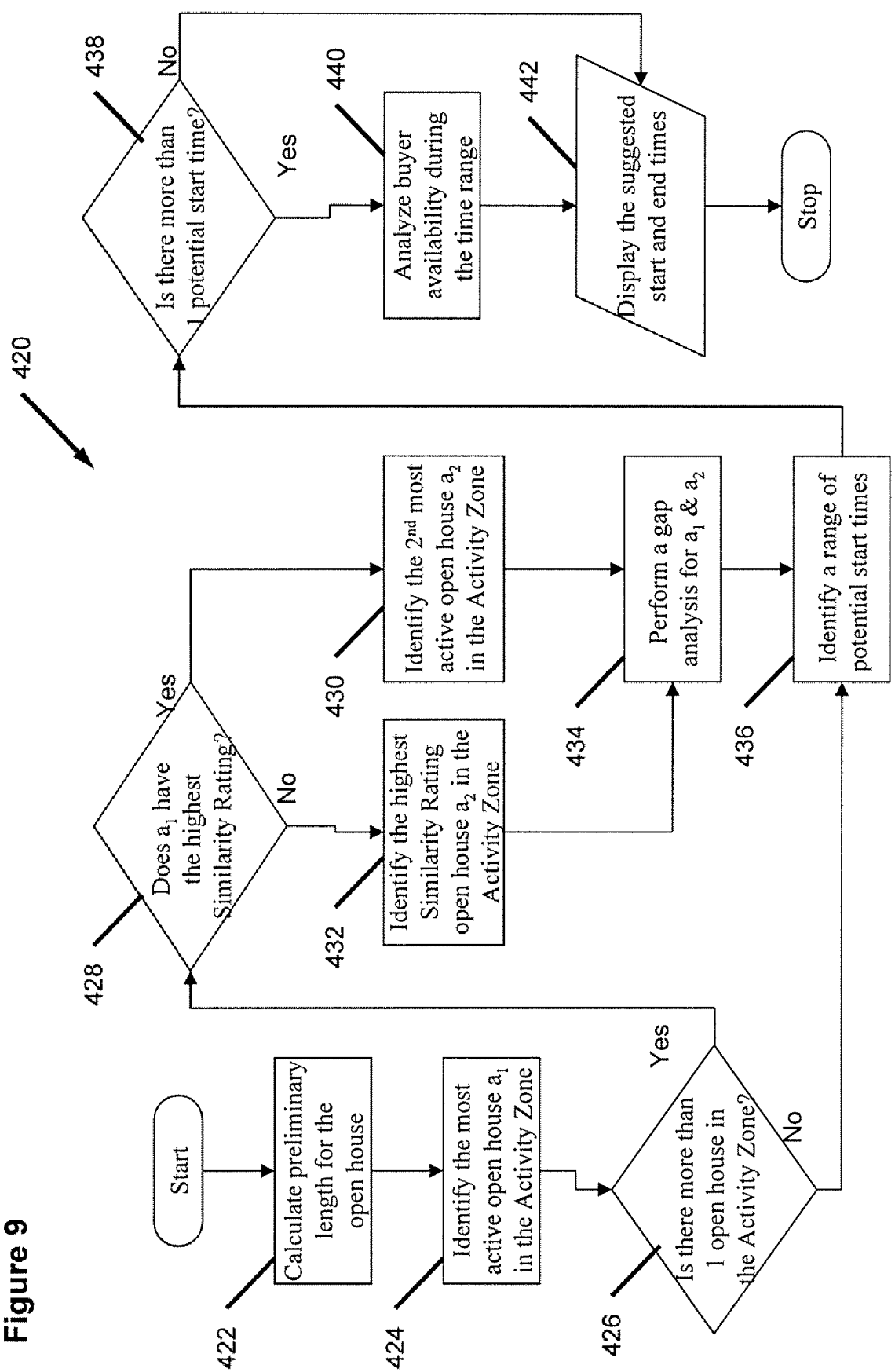
FIG. 9 illustrates an example method for determining the optimal time to schedule an open house on a particular date.

For example, referring now to FIG. 9, schedule optimization module 154 is programmed to suggest an optimal time to schedule an open house for the center property using an example method 420. Initially, at operation 422, the preliminary length of the open house is calculated according to the average length of activity zone open houses noted in the following Table 1.

TABLE 1

| Average Length | Optimal Length |
|---|---|
| ≦1.50 hours | 2.50 hours |
| >1.50 and ≦2.00 hours | 3.00 hours |
| >2.00 and ≦2.75 hours | 3.50 hours |
| >2.35 and ≦6.0 hours | 2.50 hours |
| >6.0 hours | 2.00 hours |

Other values can be used. For example, Table 2 provides alternative values that can be used to select an optimal length for an open house based on the average length for each open house in the activity zone for the selected day.

TABLE 2

| Average Length | Optimal Length |
|---|---|
| ≦2.35 hours | 3 hours |
| >2.35 hours | 2 hours |

Next, at operation 424, the system determines the most active open house in the activity zone, referred to as $a_1$. The open house that contributed most to the activity index calculation is considered most active. Next, operation 426 determines if there is more than one open house in the activity zone. If only one open house is scheduled, control is passed to operation 436. Alternatively, control is passed to operation 428 that determines if $a_1$ also has the highest similarity rating among activity zone open houses. If $a_1$ does not have the highest similarity rating, control is passed to operation 432 that sets $a_2$ equal to the open house with the highest similarity rating. Alternatively, control is passed to operation 430 that sets $a_2$ equal to the second most active open house. Next, at operation 434 the system analyzes $a_1$ and $a_2$ for overlapping open house times.

Figure 10:
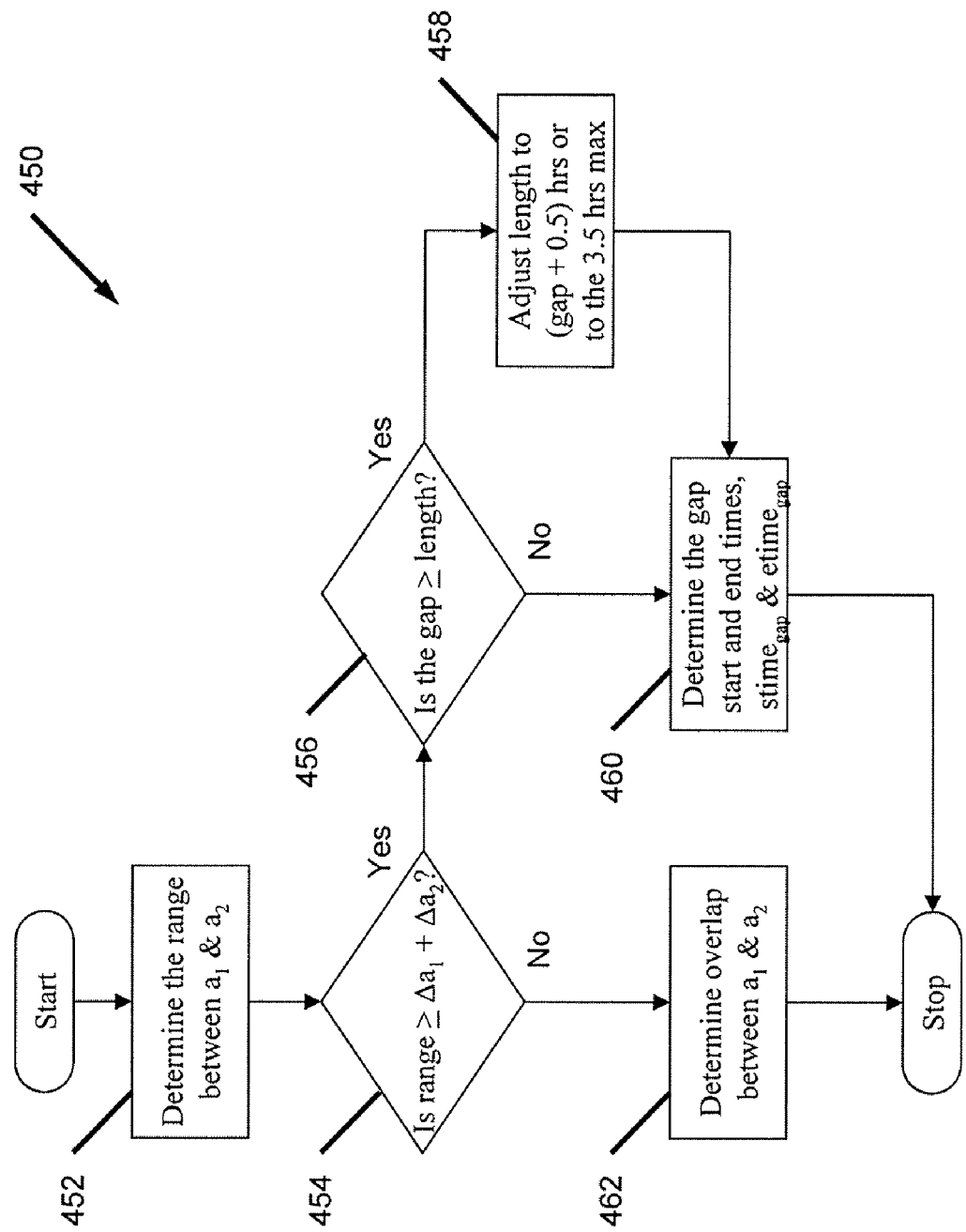
FIG. 10 illustrates an example method for examining overlap as part of the method of FIG. 9.

Referring now to FIG. 10, an example method 450 for performing overlap analysis of operation 434 is shown. At operation 452, the range of open house times for $a_1$ and $a_2$ is calculated using Equation H below.

$$\text{range} = \max(etime_{a1}, etime_{a2}) - \min(stime_{a1}, stime_{a2}) \quad (H)$$

where:
$etime_x$=end time for open house x
$stime_x$=start time for open house x Next, at operation 454, the range is compared with the combined open house lengths of $a_1$ and $a_2$. If the range less than the combined lengths, control is passed to operation 462 that determines the overlap using Equation I below.

$$\Delta_o = etime_o - stime_o \quad (I)$$

where:
$etime_o = \min(etime_{a1}, etime_{a2})$
$stime_o = \max(stime_{a1}, stime_{a2})$ Alternatively, control is passed to operation 456 that compares the suggested length of the open house with the length of the gap. Gap length is determined using Equation J below.

$$\Delta_{gap} = \text{range} - (\Delta_{a1} + \Delta_{a2}) \quad (J)$$

where:
$\Delta_{a1} = etime_{a1} - stime_{a1}$
$\Delta_{a2} = etime_{a2} - stime_{a2}$ If the gap is greater than or equal to the suggested length, control is passed to operation 458 that readjusts the suggested length according to the lesser of the gap length plus 0.5 hrs or the maximum length in Table 1. Next, at operation 460 or, alternatively, after operation 456, control is passed to operation 460, the gap between $a_1$ and $a_2$ open house times is determined using Equations K below.

$$stime_{gap} = \min(etime_{a1}, etime_{a2}) \quad (K)$$

$$etime_{gap} = \max(stime_{a1}, stime_{a2})$$

Referring back to FIG. 9, after the overlap analysis at operation 434 or having only a single activity zone open house at operation 426, control is passed to operation 436 and a range of potential start times is determined.

Figure 11:
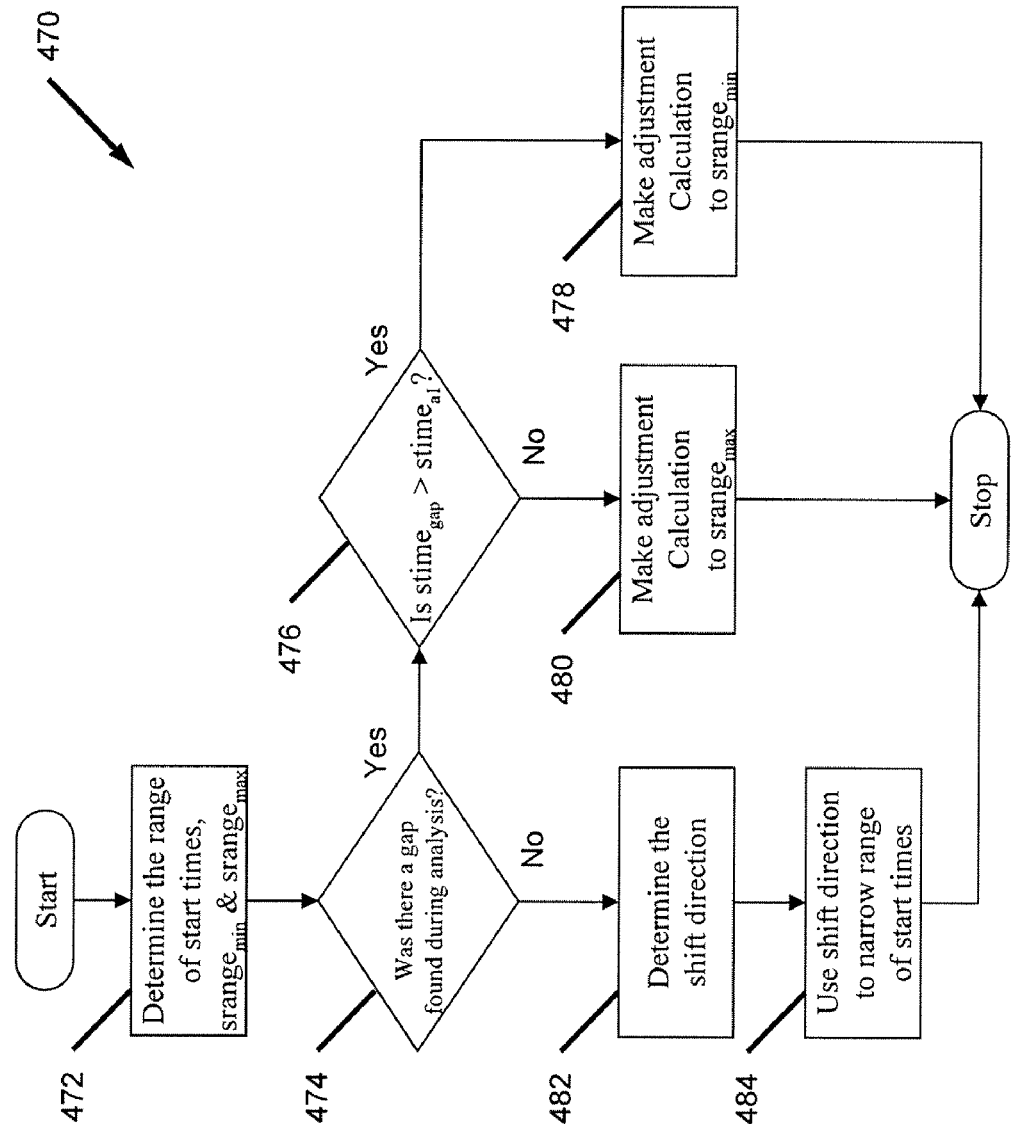
FIG. 11 illustrates an example method for identifying a range of potential start times for an open house as part of the method of FIG. 9.

Referring now to FIG. 11, an example method 470 for determining a range of start times of operation 436 is shown. At operation 472, the preliminary range is calculated using Equations L below.

$$srange_{min} = stime_{a1} - (\text{optimal length} - 0.5) \quad (L)$$

$$srange_{max} = etime_{a1} - 0.5$$

Next, at operation 474, if a gap was found then control is passed to operation 476. Alternatively, control is passed to operation 482 to determine the shift direction using Equation M below.

$$\text{shift} = (\text{baseline} - stime_{a1}) / |(\text{baseline} - stime_{a1})| \quad (M)$$

If the shift equation results in division by zero, the shift value equals +1. The time used for a baseline varies depending on the day of the week and is determined from Table 3. Alternative times can be used.

TABLE 3

| Type of Day | Baseline Time |
|---|---|
| Weekday | 4:30 pm |
| Weekend | 2:00 pm |

Next, at operation 484, the range of start times is narrowed based on the result of the shift value. Equations used to calculate the narrowed range can be seen in Table 4.

TABLE 4

| Shift | New Range |
|---|---|
| +1 | $srange_{min} = stime_{a1} + 0.5$ |
| −1 | $srange_{max} = stime_{a1} - 0.5$ |

If operation 474 passed control to operation 476 and $stime_{gap}$ is after $stime_{a1}$, control is passed to operation 478 adjusting $srange_{min}$ according to Table 5 below.

TABLE 5

| Comparison | New Range |
|---|---|
| Length >= $\Delta_{gap}$ | $srange_{min} = etime_{a1} - [length - (\Delta_{gap} + 0.5)]$ |
| Length < $\Delta_{gap}$ | $srange_{min} = etime_{a1} - 0.5$ |

Alternatively, operation 476 can pass control to operation 480 that makes adjustments to $srange_{min}$ according to Table 6 below.

TABLE 6

| Comparison | New Range |
|---|---|
| Length >= $\Delta_{gap}$ | $srange_{max} = stime_{a1} + [length - (\Delta_{gap} + 0.5)]$ |
| Length < $\Delta_{gap}$ | $srange_{max} = stime_{a1} + 0.5$ |

Referring back to FIG. 9, after identifying a range of start times at operation 436, control is passed to operation 438 to check if the range of potential start times contains more than one time. If there is only one start time, control is passed to operation 442 and the suggested start and end times are displayed. Alternatively, control is passed to operation 440 and buyer availability is analyzed.

Figure 12:
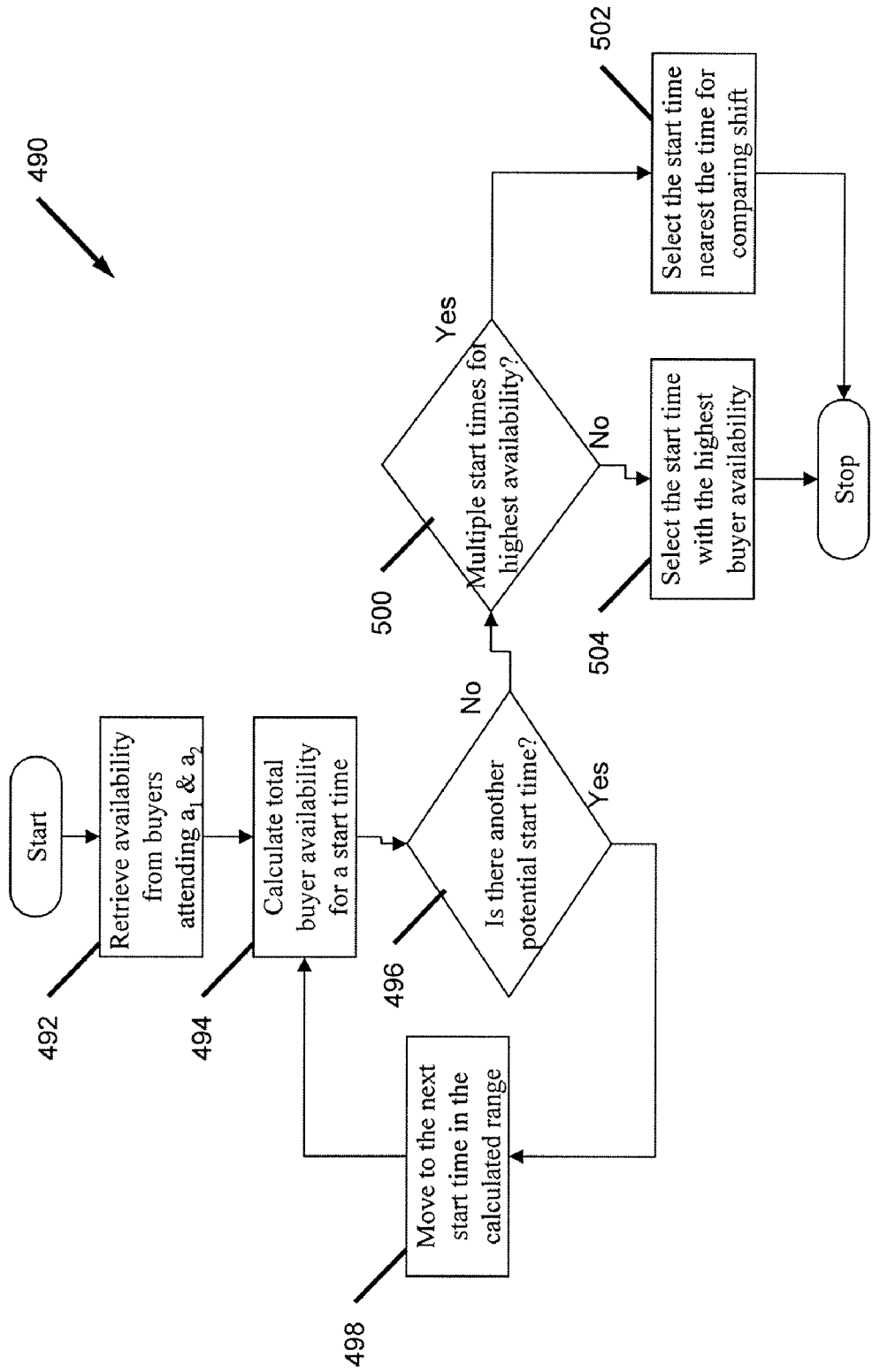
FIG. 12 illustrates an example method for analyzing buyer availability as part of the method of FIG. 9.

Referring now to FIG. 12, an example method 490 for analyzing buyer availability of operation 440 is shown. At operation 492, the system retrieves information from personal calendars for all buyers planning to attend $a_1$ or $a_2$. These calendars can be any type of electronic schedule the user chooses to sync to the system. For example, the calendar could be embedded in a software application, such as Microsoft Outlook, or be a web-based system, such as Google Calendar.

Next, at operation 494, the system calculates total buyer availability throughout the entire length of a suggested open house. Total buyer availability is calculated by adding the number of buyers available every half hour during this timeframe. Next, operation 496 determines if another set of suggested times must be analyzed. If more times exist, control is passed back to operation 494. Alternatively, control is passed to operation 500 that determines if multiple start times produced the highest buyer availability. If only one time resulted in the highest availability, control is passed to operation 504 and that result is the suggested start and end time. Alternatively, control is passed to operation 502 that identifies the start time closest to the baseline out of the highest availability results.

Referring back to FIG. 9, after analyzing buyer availability at operation 440, control is passed to operation 442. The suggested start and end times are then displayed to the seller.

Figure 13:
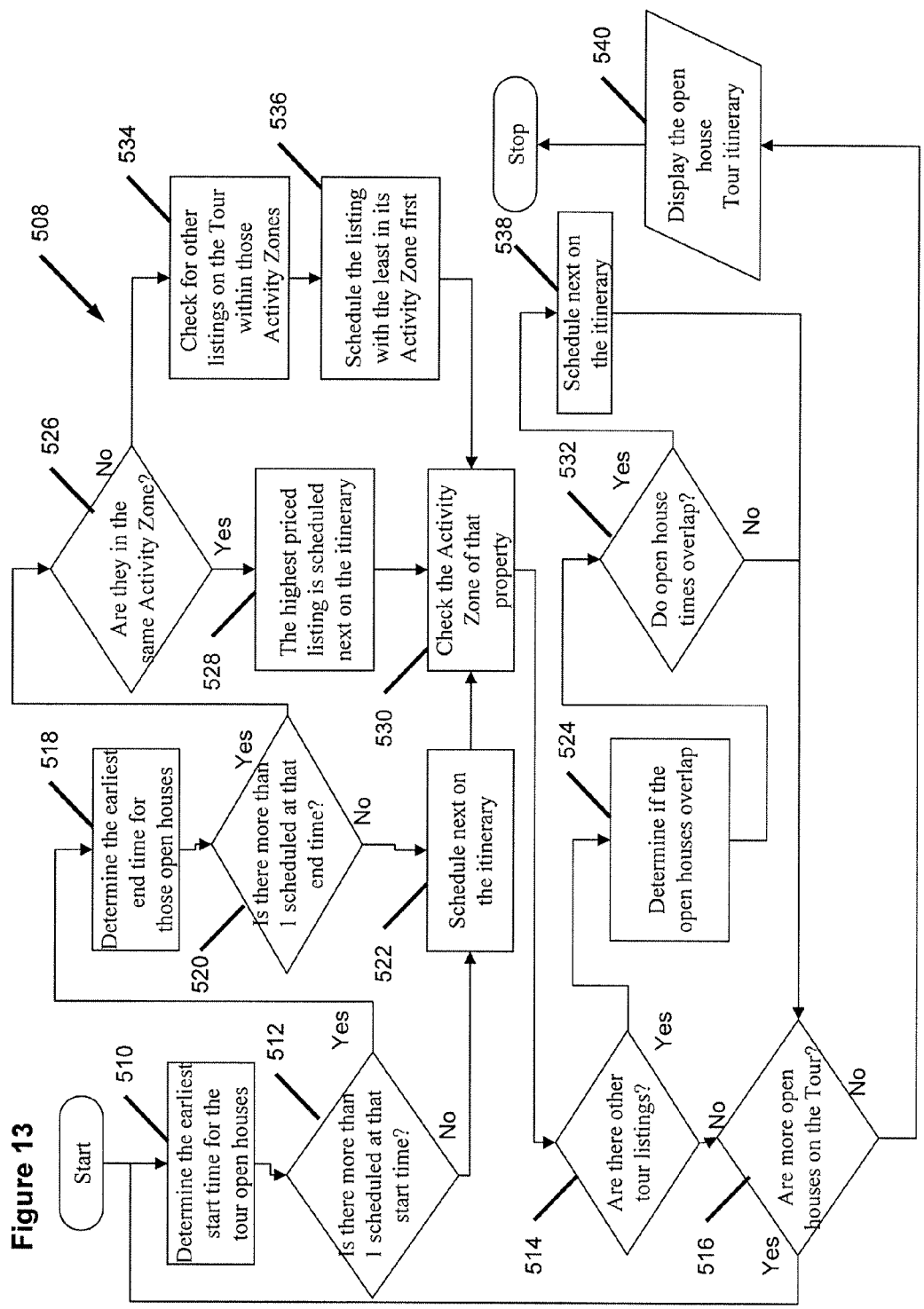
FIG. 13 illustrates an example method for suggesting a tour itinerary.

Referring now to FIG. 13, schedule optimization module 154 is also programmed to suggest an optimal tour itinerary for a potential buyer using an example method 508. Typically, a buyer assembles a list of properties with open houses the buyer is interested in attending. The selected open houses are referred to as a tour. Method 508 is then used to suggest an optimal tour itinerary for the buyer for the selected open houses in the tour.

Initially, at operation 510, the earliest start time for an open house in the tour is retrieved. Next, at operation 512, a determination is made as to whether there is more than 1 scheduled open house on the particular tour with the same start time. It there is more than 1 scheduled open house with the same start time, control is passed to operation 518, and a determination of the earliest end time for the two open houses with the same start time is made. Next, at operation 520, a determination is made as to whether there is more than 1 scheduled open house with the same end time. If there is more than 1 scheduled with the same end time, control is passed to operation 526.

At operation 526, a determination is made regarding whether the two open houses are in the same activity zone. If the two open houses are not in the same activity zone, control is passed to operation 534, and the system checks for other open houses on the tour in the activity zone. Next, at operation 536, the property with the least open houses in its activity zone is scheduled, and control is then passed to operation 530.

Next, at operation 530, the activity zone for the property with the least open houses is checked. At operation 514, a determination is made regarding whether any of the other open houses in the activity zone are on the tour. If one or more additional open houses are on the tour, control is passed to operations, 524 and 532, where a determination is made regarding whether any of the open houses overlap. If any of the open houses do overlap, control is passed to operation 538, and the overlapping open house(s) are scheduled next on the itinerary. Control is then passed to operation 516.

Alternatively, if the open houses do not overlap in operation 532, or there are no other tour listings in the activity zone at operation 514, control is passed to operation 516. At operation 516, a determination is made as to whether there are more properties on the tour to schedule. If there are more properties, control is passed back to operation 510. Alternatively, control is passed to operation 540, and the optimized open house tour itinerary is displayed.

Alternatively, if the two open houses with the same end time are in the same activity zone at operation 526, control is passed to operation 528. At operation 528, the house with the highest listing price is scheduled next on the itinerary. Next, control is passed to operation 530.

Alternatively, if there is not more than 1 open house with the same end time in operation 520, control is passed to operation 522, where the property is scheduled next on the itinerary. Control is then passed to operation 530.

Figure 14:
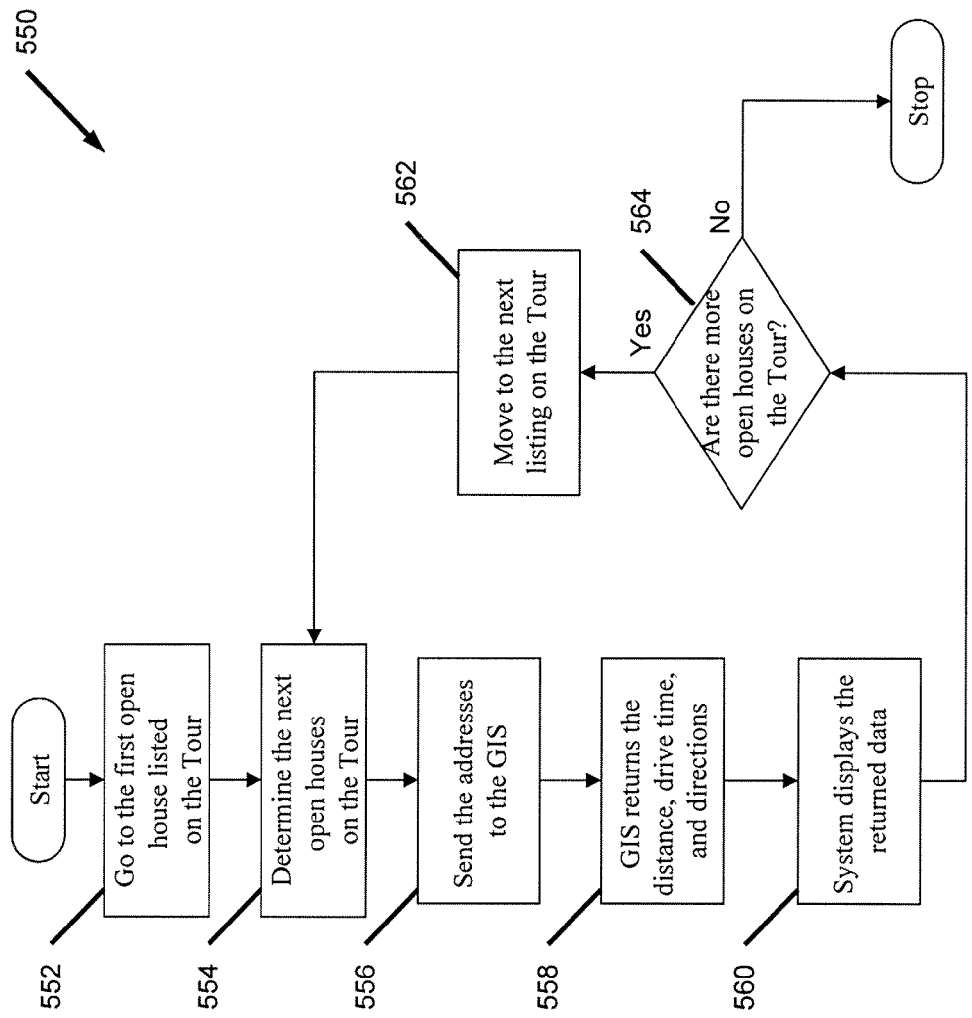
FIG. 14 illustrates an example method for identifying distances, times, and directions for a tour itinerary.

Referring now to FIG. 14, schedule optimization module 154 is also programmed to provide the driving distances, times, and directions for the suggested tour itinerary using an example method 550. At operation 552, the first property on the tour itinerary is retrieved. Next, at operation 554, the next property on the itinerary is retrieved. Next, at operation 556, the addresses for the two properties are sent to the GIS, and the database returns the estimated distance, drive time, and directions for the two properties at operation 558. Next, at operation 560, the information from the mapping solution database is displayed.

In example embodiments, system 150 is programmed to perform method 550 to calculate driving distances, times, and directions for the tour itinerary. In alternative embodiments, system 150 is programmed to pass information about each property (e.g., pre-populate inputs such as address information) to a third-party GIS, and the third-party GIS performs calculations such as driving distances, times, and directions. Examples of such third-party GISs include, without limitation, Yahoo! Driving Directions (maps.yahoo.com/dd) offered by Yahoo! Inc. of Sunnyvale, Calif., and MAPQUEST (www.mapquest.com) offered by MapQuest, Inc. of Denver, Colo.

Next, at operation 564, a determination is made as to whether additional properties are on the tour itinerary. If there are additional properties, control is passed to operation 562, and the next property is retrieved. Control is then passed to operation 554.

Referring now to FIGS. 15-18, activity alert module 156 is programmed to monitor system 150 and to notify buyers and/or sellers of new activities in the system. For example, activity alert module 156 can alert sellers of new seller or buyer activities within the activity zone, and activity alert module 156 can alert buyers of new seller activity.

Figure 15:
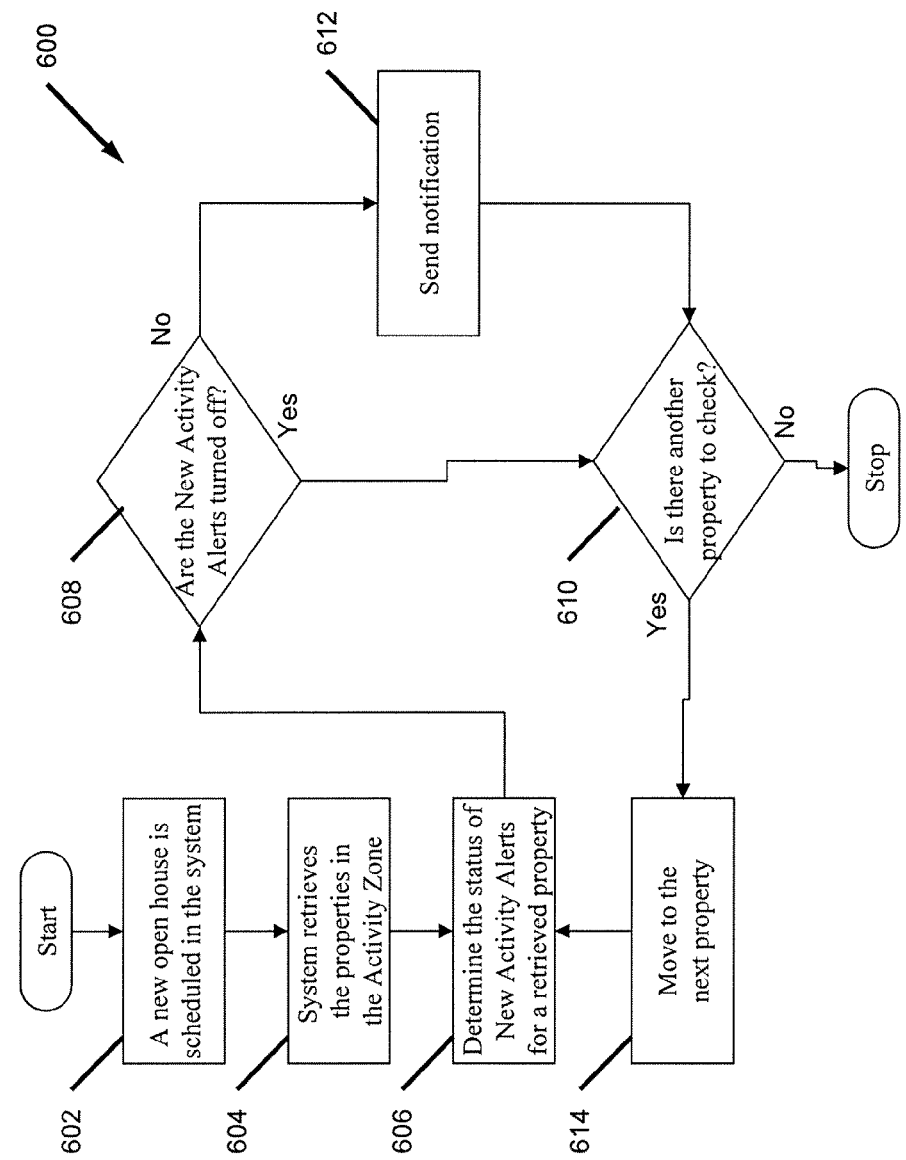
FIG. 15 illustrates an example method for alerting a seller of new seller activity in an activity zone.

For example, referring now to FIG. 15, activity alert module 156 is programmed to alert sellers of new seller activity using an example method 600. At operation 602, a new open house is scheduled in the system. At operation 604, the system retrieves other properties within the activity zone of the property with the new open house. Next, at operation 606, the system determines the new activity alert status for an activity zone property. In addition, at operation, 608, if the property has new activity alerts turned off (see FIG. 18 below), control is passed to operation 610. Alternatively, control is passed to operation 618 that sends notification to the seller of that property. Next, at operation 610, the system determines if there are any more properties to send notifications. If more properties exist, control is passed to operation 614 that moves to the next property and then again to operation 606. Alternatively, this method is completed.

In example embodiments, the notification is sent by email and can include information about the property or properties for which new open houses are scheduled. Such information can include one or more of address, asking price, number of bedrooms, number of full-bathrooms, number of half-bathrooms, and date/time the open house is scheduled. In other embodiments, other methods of notification and content can be used. For example, in alternative embodiments, notifications can be sent by way of really simple syndication ("RSS"), text message to mobile device, telephone, facsimile, or hard copy letter.

Figure 16:
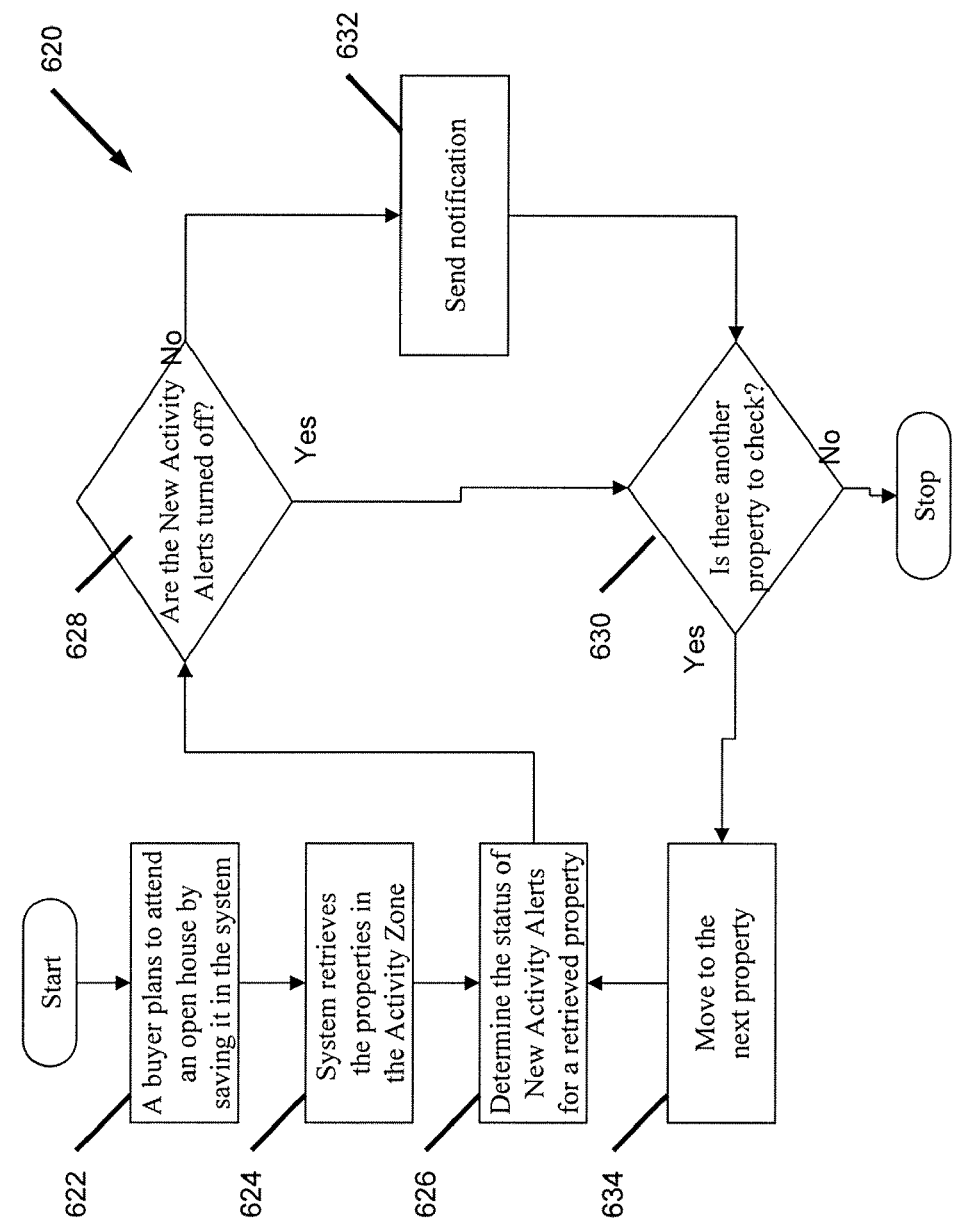
FIG. 16 illustrates an example method for alerting a seller of new buyer activity in an activity zone.

Referring now to FIG. 16, activity alert module 156 is also programmed to alert sellers of new buyer activity using an example method 620. At operation 622, a buyer schedules a new open house tour in the system by saving an open house. At operation 624, the system retrieves other properties within the activity zone(s) of the property or properties on the tour. Next, at operation 626, the system determines the new activity alert status for an activity zone property. In addition, at operation 628, if the property has new activity alerts turned off (FIG. 18 below), control is passed to operation 630. Alternatively, control is passed to operation 632 that sends notification of the new buyer activity to the seller of that property. Next, at operation 630, the system determines if there are any more properties to send notifications. If more properties exist, control is passed to operation 634 that moves to the next property and then again to operation 626. Alternatively, this method is completed.

Figure 17:
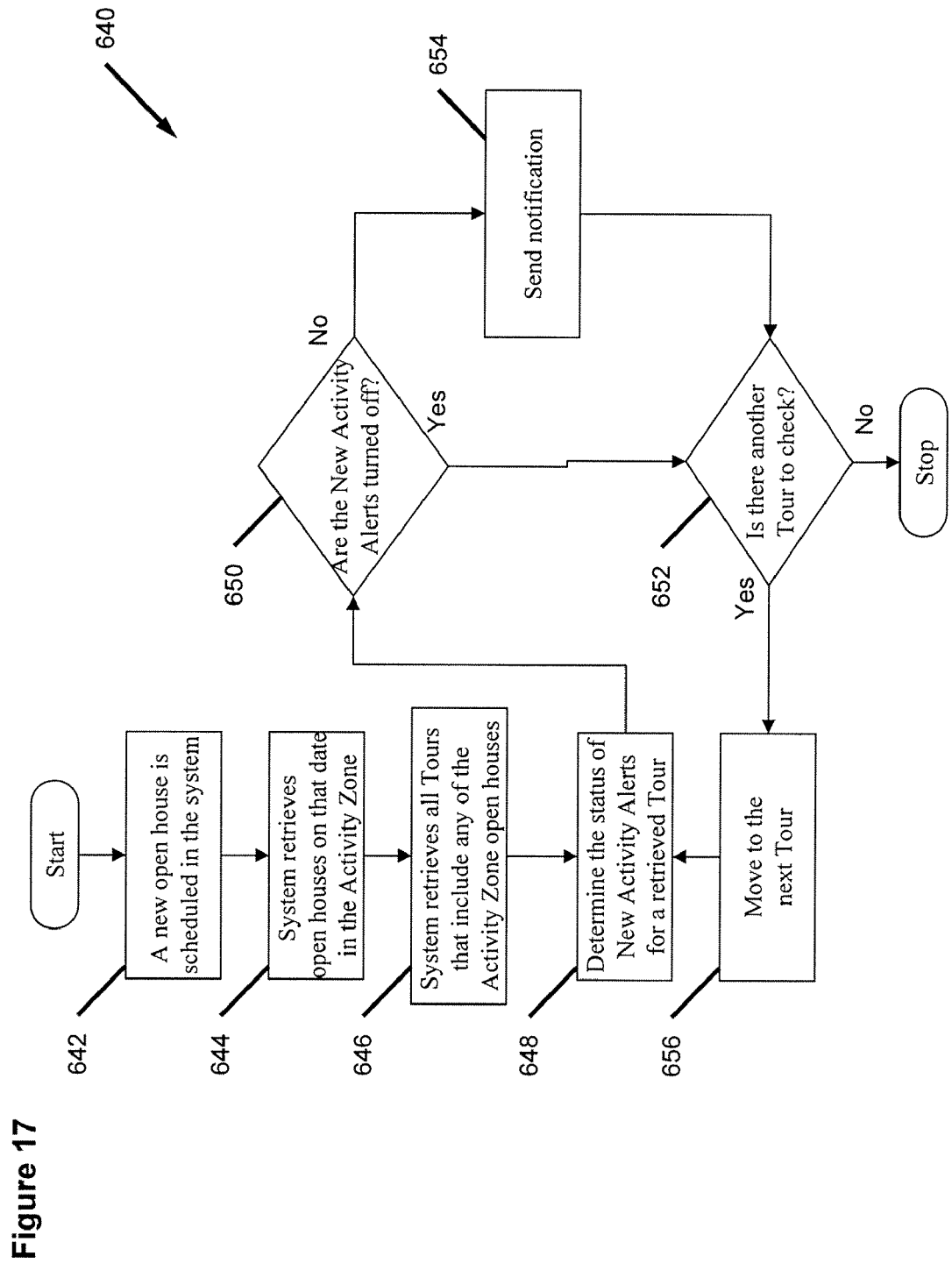
FIG. 17 illustrates an example method for alerting a buyer of new seller activity in an activity zone.

Referring now to FIG. 17, activity alert module 156 is also programmed to alert buyers of new seller activity using an example method 640. At operation 642, a seller schedules a new open house in the system for a property. At operation 644, the system retrieves other properties within the activity zone of the property. Next, at operation 646, the system determines tours that include a property within the activity zone of the new open house property. At operation 648, the system determines the new activity alert status for a tour. In addition, at operation 650, if the tour has new activity alerts turned off, control is passed to operation 652. Alternatively, control is passed to operation 654 that sends notification of the new open house to the buyer of that tour. Next, at operation 652, the system determines if there are any more tours to send notifications. If more tours exist, control is passed to operation 656 that moves to the next tour and then again to operation 648. Alternatively, this method is completed.

Figure 18:
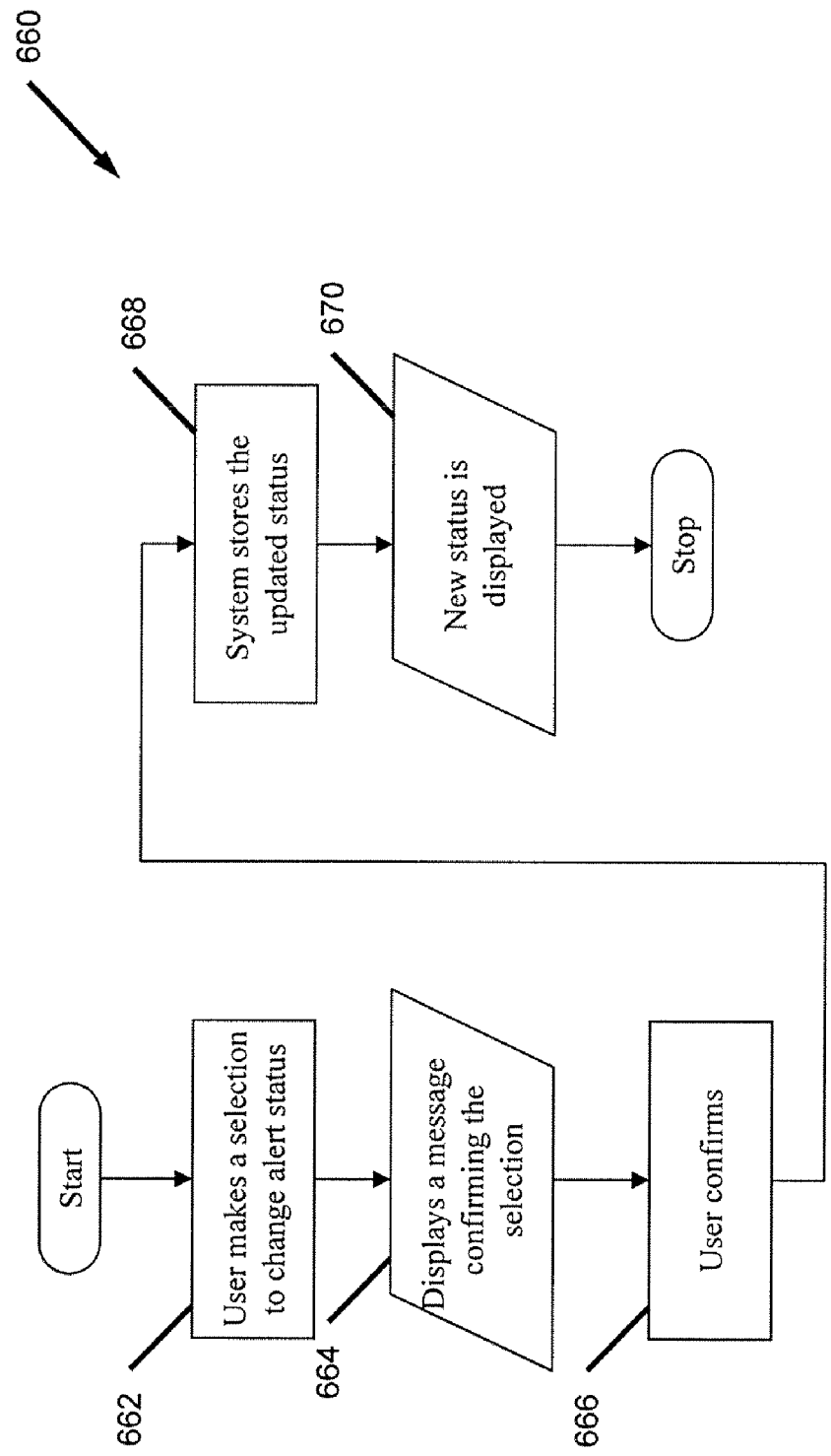
FIG. 18 illustrates an example method for turning activity alert notifications on and off.

Referring now to FIG. 18, activity alert module 156 can be configured to turn activity alerts on and off as desired using an example method 660. At operation 662, the user accesses system 150 to change the activity alert status. For example, the user can turn activity alerts on and off. If the activity alerts are turned on, the user will receive activity alert notifications. If the activity alerts are turned off, the user will not receive activity alert notifications. Next, at operation 664, the change in alert activity status is displayed for user confirmation. At operation 666, the user confirms the change, and the system stores the change at operation 668. Next, at operation 670, the new activity alert status is displayed.

Referring now to FIGS. 19-27, information from system 150 can be displayed to a buyer or seller using one or more graphical user interfaces. For example, a buyer or seller can access system 150 using computer system 110, and information from system 150 can be displayed on a monitor of computer system 110 using one or more graphical user interfaces. Example interfaces include interface 700 for sellers, interfaces 800, 840, and 860 for buyers, and hybrid interface 900.

Figure 19:
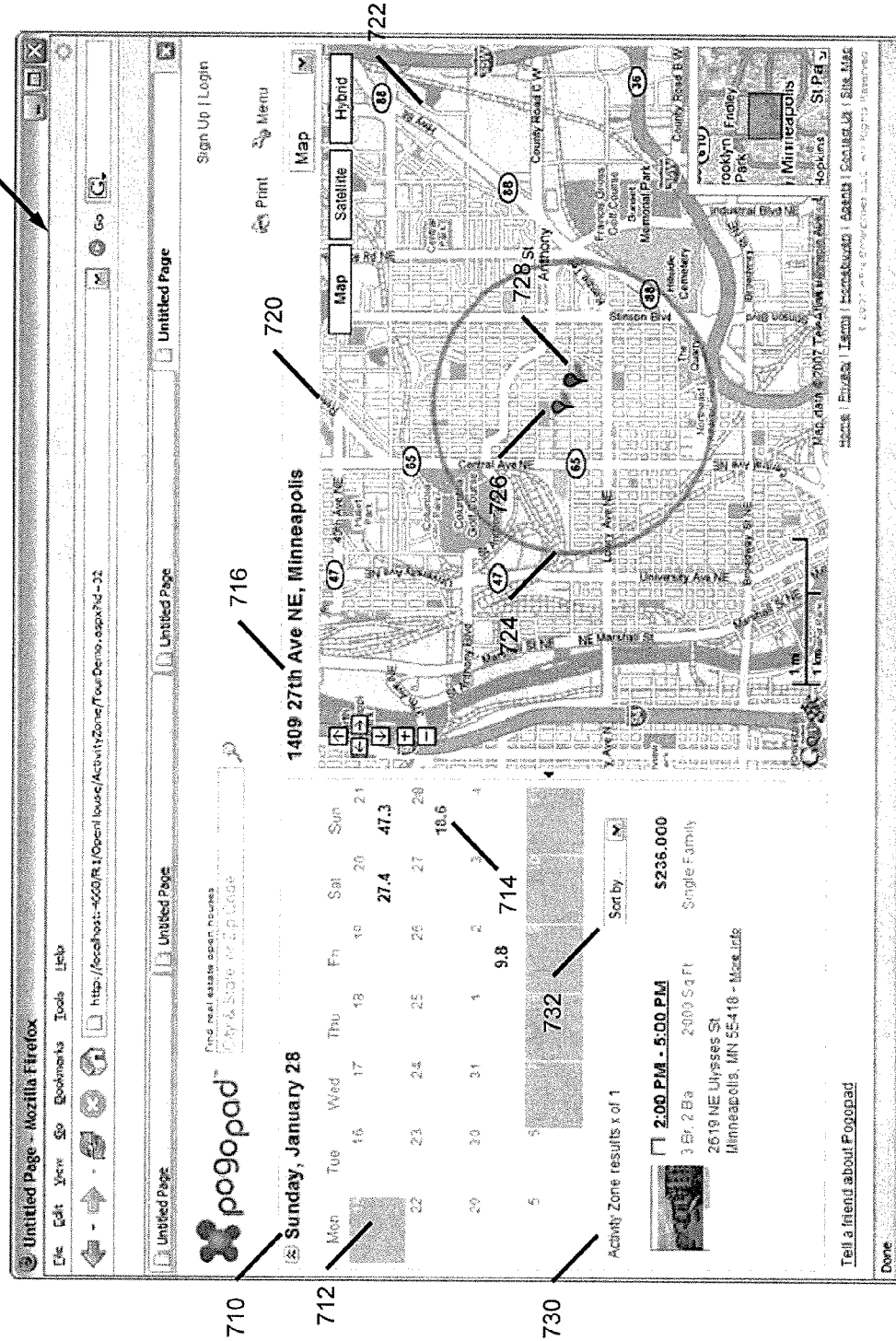
FIG. 19 illustrates an example user interface for a seller.

Referring to FIG. 19, interface 700 is shown as including a calendar 712 listing the upcoming 22 days in a window 710. Within calendar 712, the activity index, as calculated using Equation C above, for each day in a particular activity zone is shown. For example, day 714 has an activity index of 18.6. In alternative embodiments, the calendar can display the days of a particular selected month.

The seller can select one or more days, such as day 714, to obtain information about open houses in the activity zone for address 716 on the selected day(s). A window 730 provides a summary of the activity zone open houses for the selected day, including the number of open houses and details about each open house, such as the times and property characteristics. The seller can sort the activity zone open houses by selecting a value from the sort drop down menu 732. For example, the seller can sort by high price, low price, start times, end times, number of bedrooms, number of bathrooms, or square feet. Alternative sorting options can be used.

Interface 700 also includes a window 720 with a map 722 of the area of interest. In some embodiments, the map includes a circle defining the activity zone 724 on the map 722. The center property, which corresponds with address 716, is noted with reference 726, and properties with open houses are noted with references 728. In alternative embodiments, the user can select and increase/decrease the diameter of circle 724 to change the size of activity zone 724.

Figure 20:
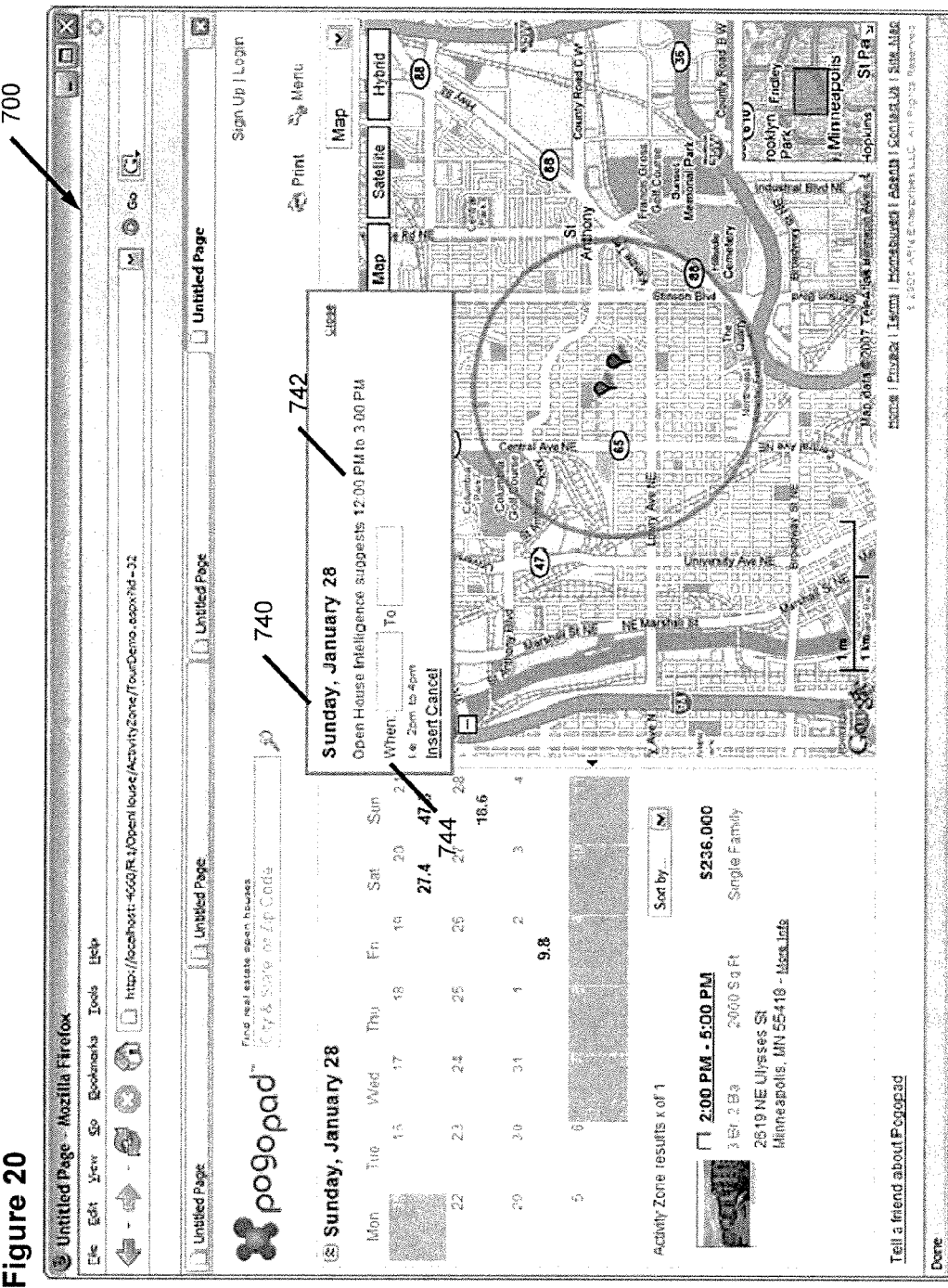
FIG. 20 illustrates another view of the user interface of FIG. 19.

Referring now to FIG. 20, interface 700 also includes a pop-up window 740 that allows a seller to schedule an open house. For example, window 740 includes information 742 including an optimal time for scheduling the open house on day 714, calculated as described above. In addition, window 740 includes text boxes 744 that allow the seller to schedule the open house.

Figure 21:
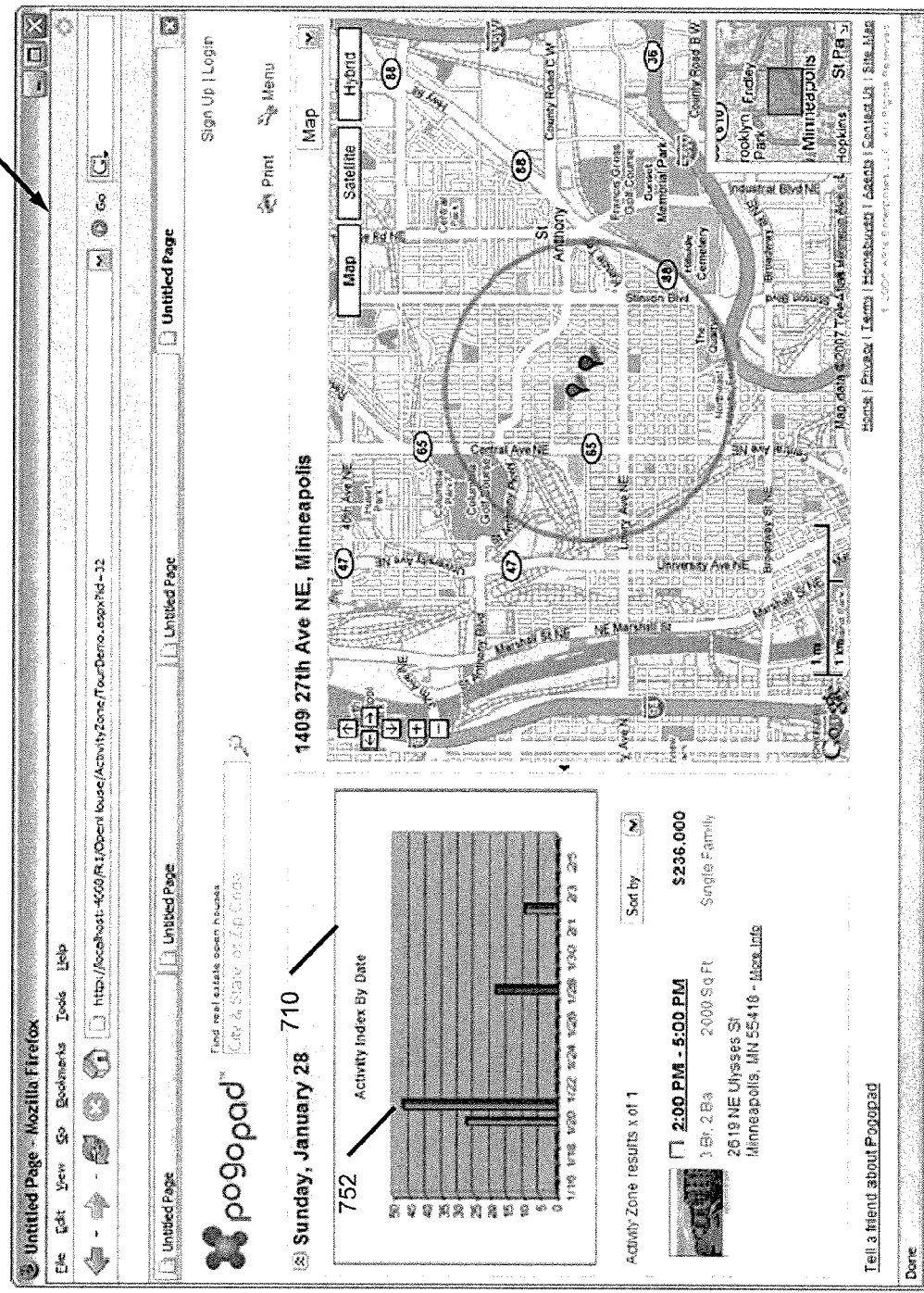
FIG. 21 illustrates another view of the user interface of FIG. 19.

Referring now to FIG. 21, interface 700 also includes a chart 752 that displays the activity index of each day shown in the calendar. The seller can view the chart 752 in window 710 as an alternative to viewing the calendar. The chart enables easy comparison of activity indexes.

Figure 22:
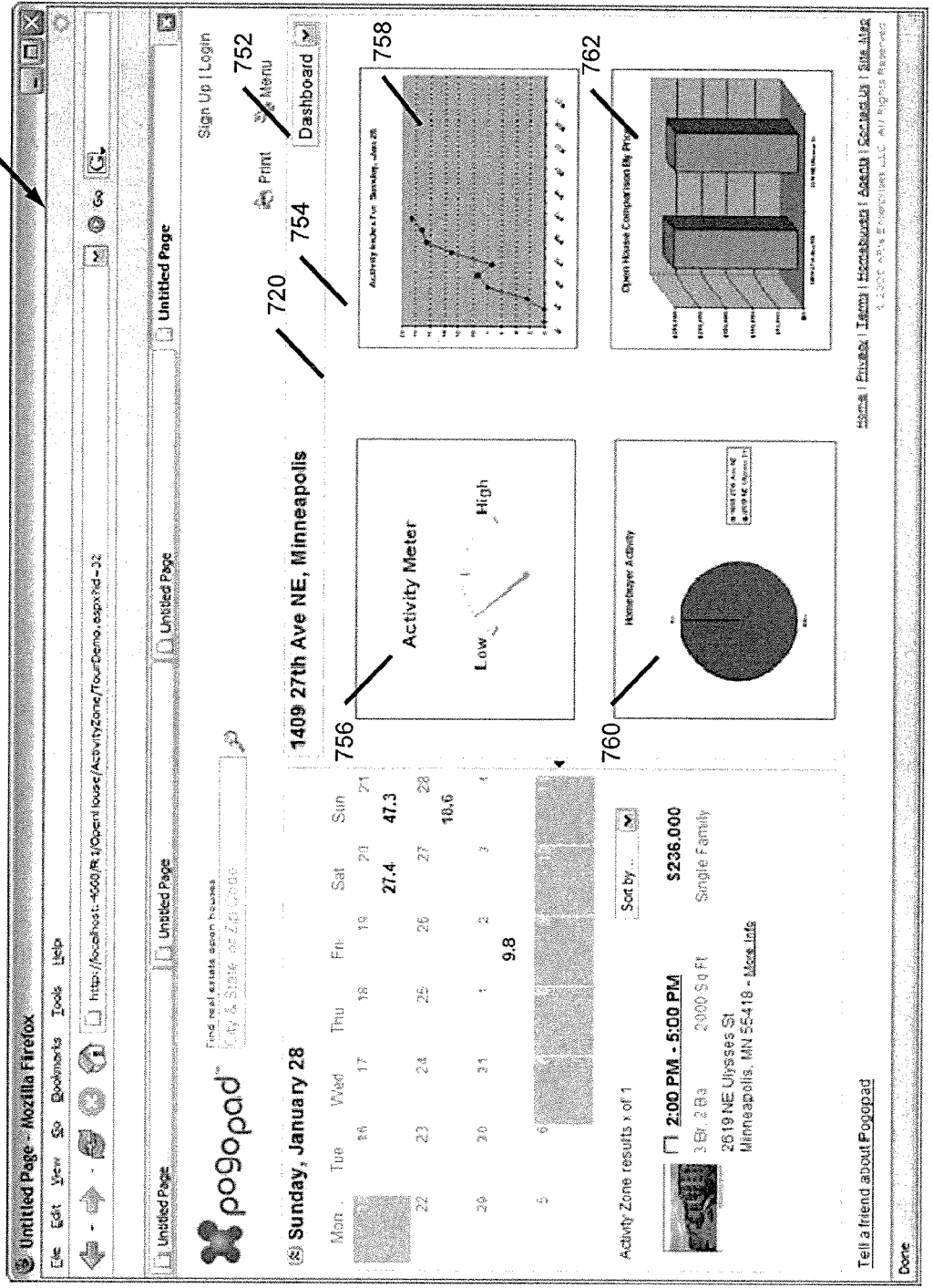
FIG. 22 illustrates another view of the user interface of FIG. 19.

Referring now to FIG. 22, interface 700 also includes a dashboard 754 that contains various charts and graphical representations relating to buyer and seller activity for the selected date. The seller can view the dashboard 754 in window 720 by selecting the "Dashboard" option from drop down menu 752. This is an alternative to viewing the map 722. Included in dashboard 754 is activity meter gauge 756 that indicates the relative amount of buyer and seller activity. Dashboard 754 also includes activity index chart 758 that displays how the activity index for the selected date has changed. Buyer activity chart 760 is also included in dashboard 754 and indicates the quantity and percentage of buyers attending each open house. Dashboard 754 also includes seller activity comparison chart 762 that displays the magnitude of a specific characteristic for each activity zone open house. The seller can select which characteristic to display. For example, the seller can display prices in comparison chart 762. In alternative embodiments, other information and chart types can be displayed in dashboard 754.

In alternative embodiments, other information can be shown in window 720. For example, other information such as a timeline of activity zone open houses can be displayed in window 720.

Once the seller has scheduled the open house, the start and end times are displayed for that particular date in calendar 712, instead of the activity index. The remaining interfaces continue to operate in the same way but indicate how the data has changed since the seller scheduled the open house. For example, activity index chart 758 can indicate the activity index has increased 10 points since the open house was scheduled. This allows the seller to continue monitoring open house activity even after scheduling the open house.

Figure 23:
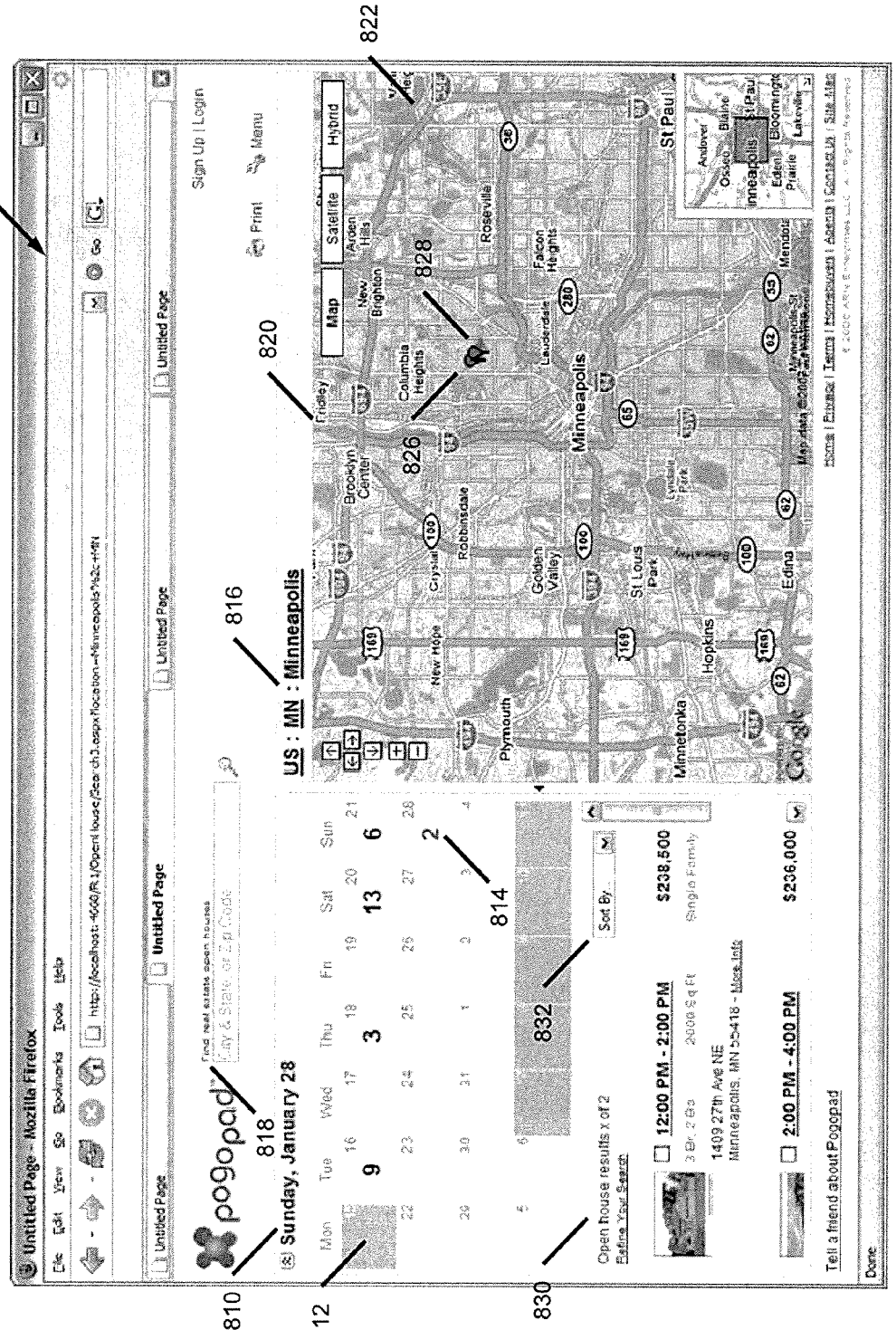
FIG. 23 illustrates an example user interface for a buyer.

Referring now to FIG. 23, interface 800 for a buyer performing an initial open house search includes a text box 818 that allows the buyer to search for other properties not listed in a particular activity zone. For example, the buyer can search by state, city, and/or keywords. Advanced searching options are available, and the buyer can save prospective properties to a "My Favorites" section.

Example interface 800 is shown as including a calendar 812 listing the search results for the upcoming 22 days in a window 810. Within calendar 812, the number of open houses scheduled for each day in location 816 is shown. For example, day 814 has two open houses scheduled in Minneapolis, Minn. Open house search results are listed in window 830 and can be sorted using the sort drop down menu 832. Results include the number of open houses and details about each open house, such as the times and property characteristics. In alternative embodiments, results can include alternative information. The buyer can select one or more days, such as day 812, to obtain information about open houses on the selected day(s). Interface 800 also includes a window 820 with a map 822 of the area of interest. Properties with open houses are noted with references 826, 828.

Figure 24:
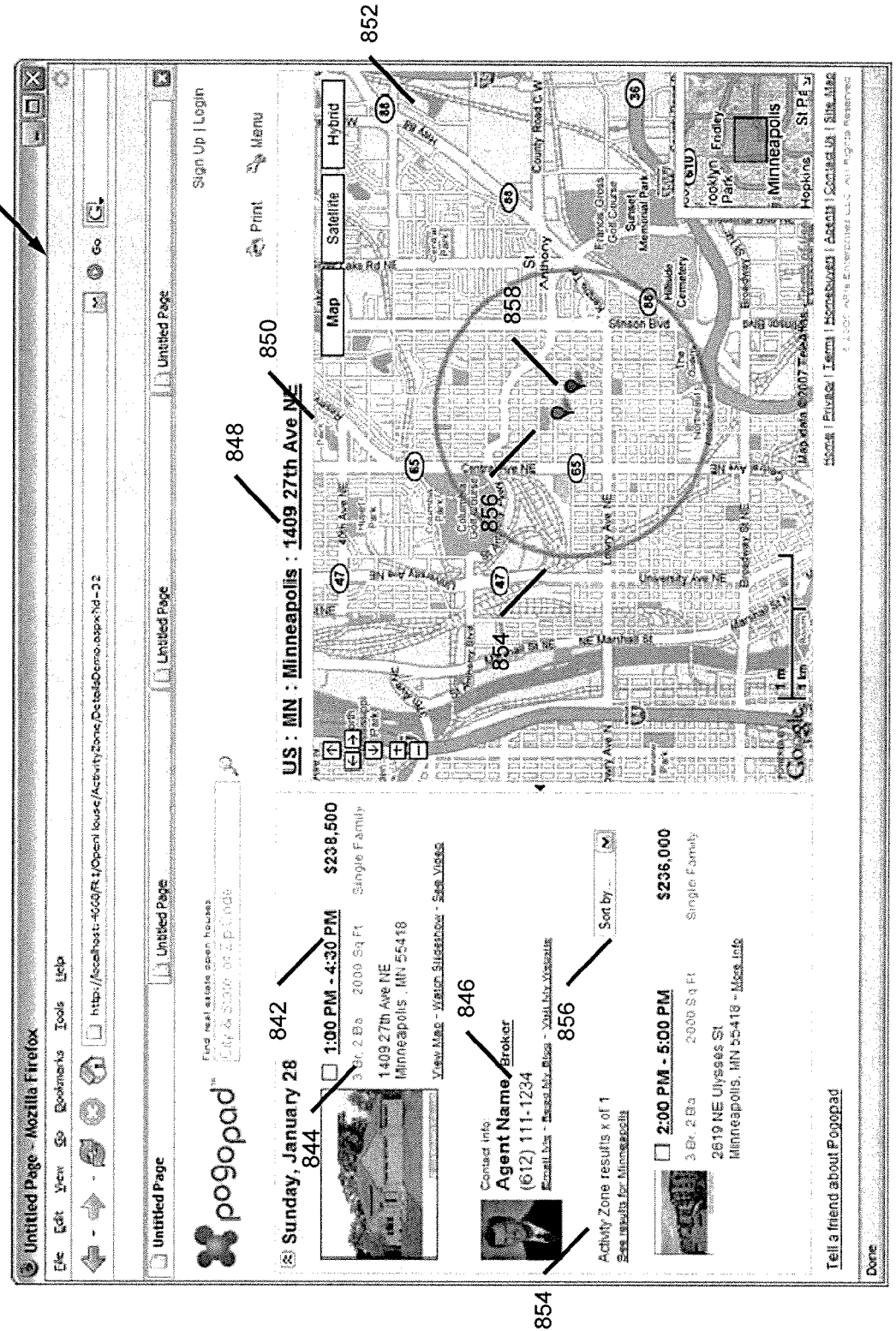
FIG. 24 illustrates another view of the user interface of FIG. 23.

Referring now to FIG. 24, example interface 840 for a buyer that selected a particular open house in interface 800 displays the activity zone surrounding the selected open house. Interface 840 includes window 842 that contains the open house details 844 and contact information 846. Interface 840 also includes a window 850 with a map 852 of the area of interest. In some embodiments, the map includes a circle defining the activity zone 854 on the map. The center property, which corresponds with address 848, is noted with reference 856, and properties with open houses are noted with references 858. In alternative embodiments, the user can select and increase/decrease the diameter of circle 854 to change the size of activity zone 854.

A window 854 provides a summary of the activity zone open houses for the selected property on a particular day, including the number of open houses and details about each open house, such as the times and property characteristics. The buyer can sort the activity zone open houses by selecting a value from the sort drop down menu 856. For example, the buyer can sort by high price, low price, start times, end times, number of bedrooms, number of bathrooms, or square feet. Alternative sorting options can be used.

Figure 25:
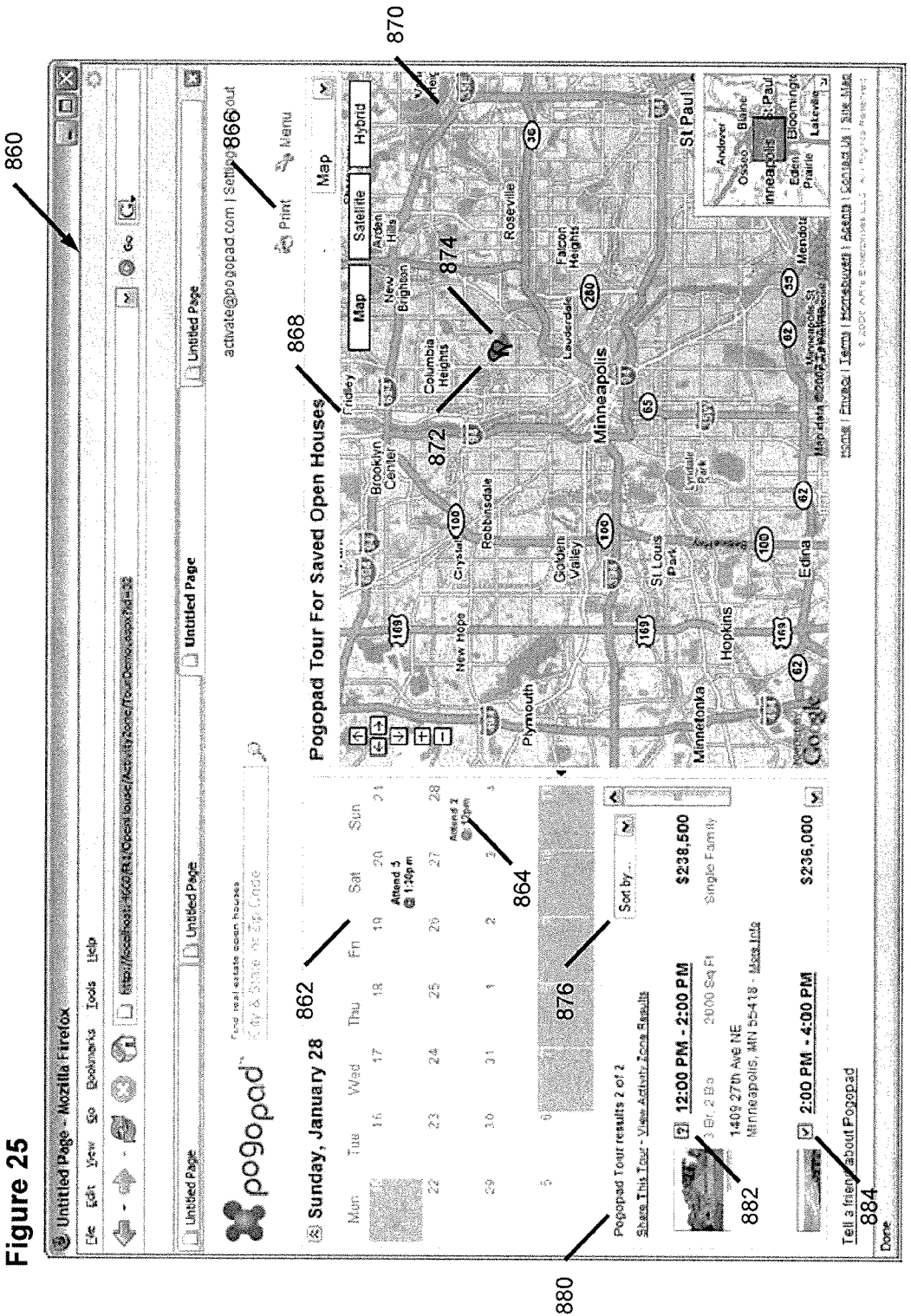
FIG. 25 illustrates another view of the user interface of FIG. 23.

Referring now to FIG. 25, example interface 860 for a buyer to plan an open house tour is shown as including a calendar 862 that identifies dates with saved open houses 864 for the upcoming 22 days. Interface 860 also includes a window 868 that displays a map 870 identifying the location of saved open houses 872, 874.

Interface 860 also includes a window 880 that lists the properties that have been selected for the tour. The buyer can scroll through information about the properties and can add/remove properties from the tour. Open houses the buyer saved with the attendance option "Yes" are noted with a checkmark 884. The open houses saved with attendance option "Maybe" are noted with question mark 882. In some embodiments, the buyer can also add properties using other methods such as, for example, by dragging and dropping desired properties into window 880. The properties can be listed in window 880 in one of a plurality of different desired orders such as, for example, by the order in which the properties were added into window 880, or by different characteristics associated with the properties such as by price, number of bedrooms, etc. The buyer can also select a button to search for other open houses scheduled within an activity zone of a particular property listed on the tour in window 880 or all the activity zones included in the tour.

When the buyer has selected the properties the buyer wishes to tour, the buyer can select the "Print" link 866 or use the sort drop down menu 876 to initiate the system to generate an optimal tour itinerary using, for example, method 508 described above. In example embodiments, the optimal tour itinerary is shown in window 880. In alternative embodiments, a separate user interface is generated to provide the buyer with information about the optimal tour itinerary. In example embodiments, the optimal tour itinerary can be printed or sent (e.g., by facsimile or email) to the buyer.

Figure 26:
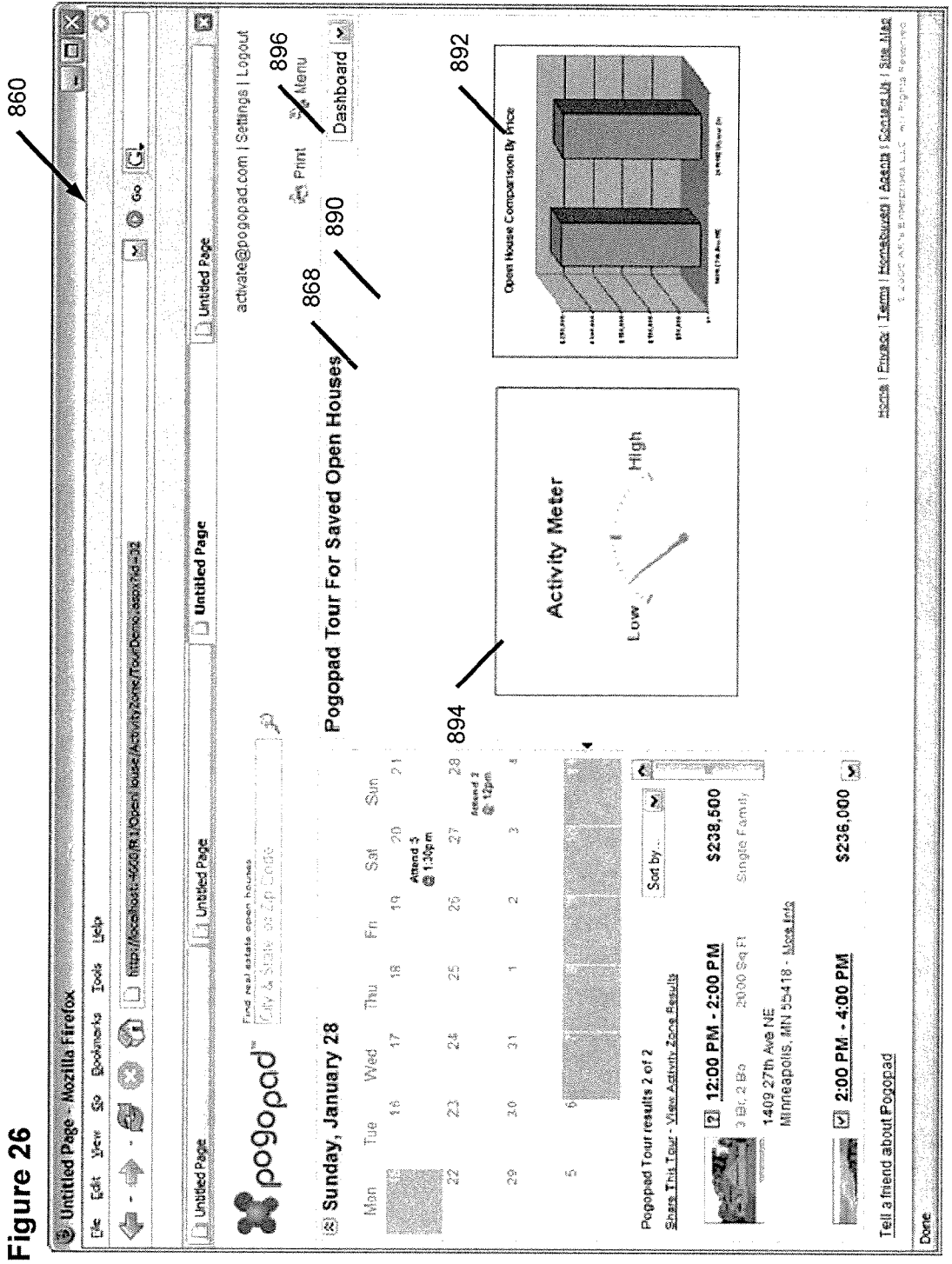
FIG. 26 illustrates another view of the user interface of FIG. 25.

Referring now to FIG. 26, interface 860 also includes a dashboard 890 that contains various charts and graphical representations relating to seller activity for the selected date. The buyer can view the dashboard 890 in window 868 by selecting the "Dashboard" option from drop down menu 896. This is an alternative to viewing the map. Included in dashboard 890 is an activity meter gauge 894 that indicates the relative amount of seller activity. Dashboard also includes seller activity comparison chart 892 that displays the magnitude of a specific characteristic for each open house on the tour. The buyer can select which characteristic to display. For example, the buyer can display prices in comparison chart 892. In alternative embodiments, other information and chart types can be displayed in dashboard 890.

Figure 27:
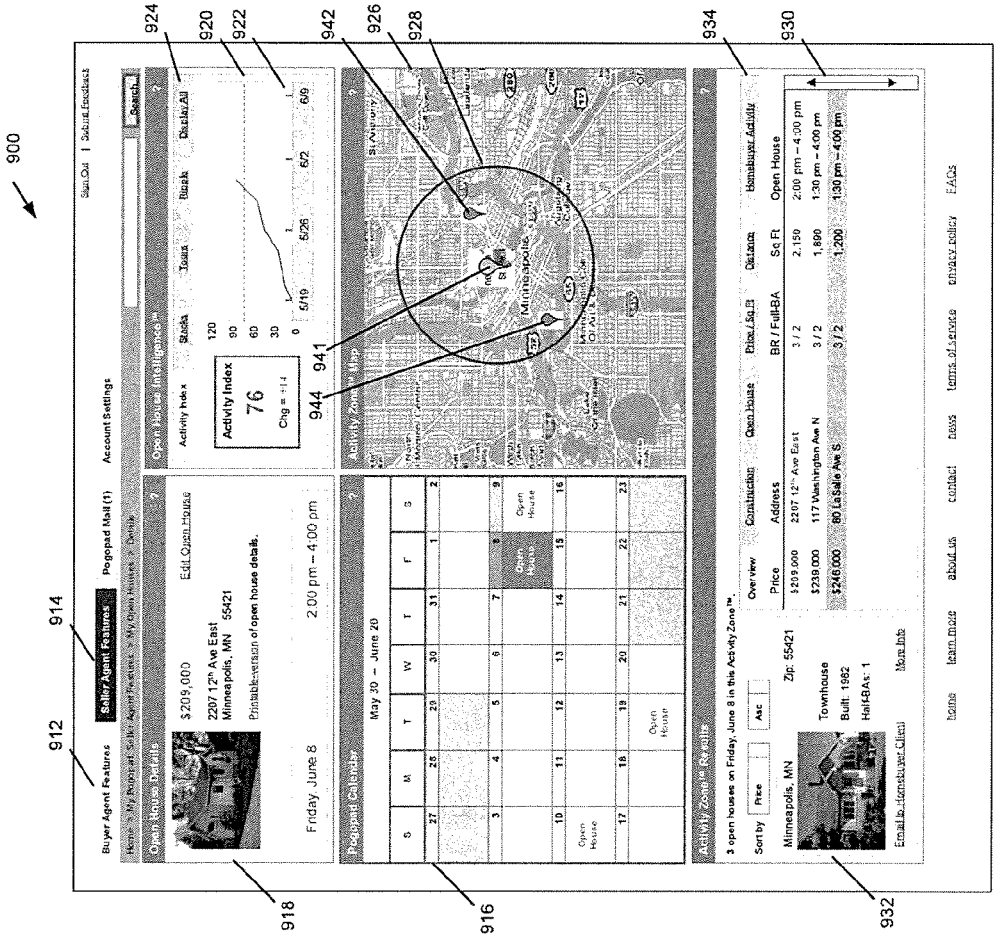
FIG. 27 illustrates an example user interface for a seller or a buyer.

Referring now to FIG. 27, another example embodiment of a user interface 900 is shown. Interface 900 includes buttons 912, 914 that allow buyers and sellers to select the content of interface 900. For example, as shown in FIG. 27, the user has selected button 914 to show seller information in interface 900.

Interface 900 includes a calendar 916, and a window 918 with information about the property for which the open house is being scheduled. This information can include asking price, address, and open house date/time. In some embodiments, one or more pictures of the property are also included.

Interface 900 also includes a window 924 that provides information such as statistics including the activity index, the number of new open houses scheduled ("stacks"), the number of tours scheduled, and, in some embodiments, the ripple effect for the selected day (the ripple effect is described further below). The user can select between this information using a toolbar 924. In addition, window 920 includes a graphical representation 922 of the particular selected statistic, such as the change in the activity index over time, as illustrated in FIG. 27.

Interface 900 also includes a window 926 with a map of the area of interest. In some embodiments, the map includes a circle defining the activity zone 928 on the map. The center property is noted with reference 941, and properties with open houses are noted with references 942, 944. In alternative embodiments, the user can select and increase/decrease the diameter of circle 928 to change the size of activity zone 928.

Interface 900 also includes a window 930 with information about the properties in the activity zone with open houses scheduled. The user can use a toolbar 934 to select between different information such as, for example, an overview, property type, open house schedule, asking price, distance, and activity. Window 930 can also include a window 932 with information about a property selected in window 930. Window 932 can include information and/or links for contacting the seller of the property for more information. Window 932 can also include one or more pictures of the selected property.

In some embodiments, the user can hover over or otherwise select information on interface 900 to obtain further information. For example, if the user clicks on an open house listed in window 930, a new interface can be loaded to provide additional information about the open house and property associated therewith. Other configurations are possible.

Alternative embodiments for the systems and methods described herein are possible. For example, in one alternative embodiment, a ripple effect can be calculated that measures the effect as more open houses are scheduled within overlapping activity zones for a particular day. The ripple effect can be calculated by determining the number of open houses in the activity zone of the center property, and searching the activity zones for each property having an open house for other open houses not previously recorded in the activity zone of the center property. The number of open houses in the subsequent specified activity zones of the returned properties is calculated, and the total number of open houses in overlapping activity zones for the center property on that selected day is displayed.

In another alternative embodiment, the coefficient of buyer activity $c_{Tour}$ can be modified to factor in whether a particular tour is an agent-guided tour, which is a tour during which a buyer's agent accompanies the potential buyer, or a self-guided tour, which is a tour conducted only by the potential buyer. For example, tours involving an agent can be weighted more heavily.

One or more advantages are associated with the systems and methods disclosed herein. For example, by optimizing the scheduling of open houses, the number of open houses that can be attended by buyers is increased. In addition, open house attendance can be increased through optimizing tour itineraries. In addition, open house attendance can be increased by notifying buyers and sellers of new open house and tour activity in surrounding properties.

The various embodiments described above are provided by way of illustration only and should not be construed to limiting. Those skilled in the art will readily recognize various modifications and changes that may be made to the embodiments described above without departing from the true spirit and scope of the disclosure.

What is claimed is:

1. A computer system for scheduling open houses, the computer system comprising:
   a processing unit; and
   computer readable media encoding instructions that, when executed by the processing unit, cause the processing unit to create:
   an activity analysis module programmed to receive first characteristics associated with a property to be sold by a seller and compare second characteristics associated with one or more properties that are located within an activity zone with the first characteristics to determine a similarity of the properties to the property to be sold by the seller; and
   a schedule optimization module programmed to suggest an optimum time for the seller to schedule an open house for the property to be sold based on an analysis of open houses scheduled by similar properties identified by the activity analysis module that are most similar to the property to be sold and a buyer activity level associated with the similar properties, the optimum time being selected based on when a number of the open houses for the similar properties are scheduled and a number of buyers are scheduled to be active at the similar properties by the activity analysis module.

2. The computer system of claim 1, further comprising an activity alert module programmed to monitor the computer system and to notify the seller of new activities in the computer system.

3. The computer system of claim 2, wherein the activity alert module is further programmed to alert the seller of new seller or new buyer activities within the activity zone.

4. The computer system of claim 1, wherein the activity zone is a specific geographic area that includes all properties currently for sale within a specific radius of a center property.

5. The computer system of claim 1, wherein the activity analysis module calculates a similarity rating that quantifies a similarity of an activity zone property to a center property.

6. The computer system of claim 5, wherein the similarity rating is calculated using one or more scale factors selected from the group consisting of number of bedrooms, number of full-bathrooms, number of half-bathrooms, property type, number of square feet, year built, price, and distance from the center property.

7. The computer system of claim 1, wherein the activity analysis module is further programmed to calculate an activity index that quantifies seller and buyer open house activity within the activity zone for a given day.

8. A computer method for scheduling open houses, the method comprising:
   receiving first characteristics associated with a property to be sold by a seller;
   comparing, by a computer system having a processing unit and computer readable media, second characteristics associated with one or more properties that are located within an activity zone with the first characteristics;
   determining a similarity of the properties to the property to be sold by the seller, the similarity being used to select similar properties that are most similar to the property to be sold by the seller; and
   suggesting, by the computer system, an optimum time for the seller to schedule an open house for the property to be sold based on an analysis of open houses scheduled by the similar properties that are most similar to the property to be sold and a buyer activity level associated with the similar properties, the optimum time being selected when a number of the open houses for the similar properties are scheduled and a number of buyers are scheduled to be active at the similar properties.

9. The method of claim 8, further comprising notifying the buyer or the seller of new activities within the activity zone.

10. The method of claim 9, wherein notifying the seller of the new activities further comprises alerting the seller of new seller or new buyer activities within the activity zone.

11. The method of claim 8, further comprising defining the activity zone as a specific geographic area that includes all properties currently for sale within a specific radius of a center property.

12. The method of claim 8, further comprising calculating a similarity rating that quantifies a similarity of an activity zone property to a center property.

13. The method of claim 12, wherein calculating the similarity rating further includes using one or more scale factors selected from the group consisting of number of bedrooms, number of full-bathrooms, number of half-bathrooms, property type, number of square feet, year built, price, and distance from the center property.

14. The method of claim 8, further comprising calculating an activity index that quantifies seller and buyer open house activity within the activity zone for a given day.

* * * * *